United States Patent
Fox et al.

(10) Patent No.: US 8,644,837 B2
(45) Date of Patent: Feb. 4, 2014

(54) TELECOMMUNICATIONS NETWORKS

(75) Inventors: David Fox, Newbury (GB); Youssef Chami, Newbury (GB)

(73) Assignee: Vodafone IP Licensing Limited, Newbury, Berkshire (GB)

(*) Notice: Subject to any disclaimer, the term of this patent is extended or adjusted under 35 U.S.C. 154(b) by 56 days.

(21) Appl. No.: 13/315,422

(22) Filed: Dec. 9, 2011

(65) Prior Publication Data

US 2012/0149382 A1  Jun. 14, 2012

(30) Foreign Application Priority Data

Dec. 10, 2010  (GB) .................................. 1020991.4

(51) Int. Cl.
*H04W 40/00*  (2009.01)

(52) U.S. Cl.
USPC ....... 455/445; 455/41.2; 455/435.2; 455/436; 455/452.2; 455/441; 370/331; 370/338; 370/401

(58) Field of Classification Search
USPC ................ 455/445, 433, 422.1–425; 370/252
See application file for complete search history.

(56) References Cited

U.S. PATENT DOCUMENTS

| | | | | |
|---|---|---|---|---|
| 5,457,680 A * | 10/1995 | Kamm et al. | ................. | 370/332 |
| 5,544,222 A * | 8/1996 | Robinson et al. | ............. | 455/557 |
| 5,825,759 A * | 10/1998 | Liu | ................................ | 370/331 |
| 6,332,077 B1 * | 12/2001 | Wu et al. | ..................... | 455/432.1 |
| 6,970,434 B1 * | 11/2005 | Mahany et al. | ................ | 370/256 |
| 7,463,890 B2 * | 12/2008 | Herz et al. | ..................... | 455/445 |
| 7,650,151 B2 * | 1/2010 | Medepalli et al. | ............ | 455/450 |
| 2010/0097995 A1 * | 4/2010 | Murphy et al. | ............... | 370/328 |
| 2012/0064908 A1 * | 3/2012 | Fox et al. | .................... | 455/452.2 |

FOREIGN PATENT DOCUMENTS

| | | |
|---|---|---|
| EP | 2 403 290 A1 | 1/2012 |
| WO | WO96/13951 | 5/1996 |
| WO | WO2011/119439 A2 | 9/2011 |
| WO | WO2012/004777 A2 | 1/2012 |

* cited by examiner

*Primary Examiner* — Sharad Rampuria
(74) *Attorney, Agent, or Firm* — Muirhead and Saturnelli, LLC

(57) ABSTRACT

A mobile telecommunications network includes a plurality of terminals, a core and a radio access network having a radio device for providing wireless communication resources to the terminals. Further provided is a processing device for recording information indicative of a movement cycle of at least one of the terminals through the radio access network and for identifying points within the movement cycle at which there are spare communication resources to provide a list of spare resource points to the terminal to enable the prediction of optimal data transfer points during a subsequent movement cycle of the terminal through the radio access network.

20 Claims, 19 Drawing Sheets

TELECOMMUNICATIONS NETWORKS

TECHNICAL FIELD

This application relates to a mobile telecommunications network including a core and a radio access network having a device for wireless communication with mobile terminals registered with the network.

BACKGROUND

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. In fact it has been reported that mobile data growth grew 30 percent over the course of the second quarter of 2009. The most popular use for mobile data was HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operator's viewpoint, as the mobile broadband traffic volume carried over 2G, 3G and HSPA (High Speed Packet Access) networks continues to grow, the cost of supporting this data volume is becoming more and more expensive based on the current network architecture and deployments. In fact, access and data volumes are likely to rise faster than the revenue used to build and maintain the networks. This cost differential is exacerbated by one of the current business models being utilised, whereby operators charge a flat rate for unlimited amounts of data.

The increased usage is also unfortunately likely to result in an increase of data traffic jams, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems will only get worse with moves to position mobile data as a replacement for fixed DSL (Digital Subscriber Line) access and with the advent of higher radio access speeds with the proposed 4G LTE/SAE (Long Term Evolution/System Architecture Evolution) network. A large percentage of this traffic will consist of data which is destined for the public Internet, a significant proportion of which mobile operators will not be able to add value to, despite carrying the data on their own backhaul transport, core transport or cellular core infrastructure.

In addition to the problems discussed above, conventional mobile telephone communications networks have architectures that are hierarchical and expensive to scale. Many of the network elements, such as the BTS, routers, BSC/RNC etc are proprietary: devices of one manufacturer often do not interface with devices from another manufacturer. This makes it difficult to introduce new capabilities into the network as a different interface will be required for devices from each manufacturer. Further, conventional base stations are not capable of intelligent local routing or processing. Furthermore, the capacity of existing networks is not always used effectively. For example, many cell sites are under used, whilst others are heavily used.

The current network architecture has the following disadvantages:
- Hierarchical and expensive to scale
- Backhaul is a major problem
- Proprietary platforms: BTS, BSC/RNC, SGSN etc
- Closed nodes and interfaces
- Very limited application or customer awareness (except for QoS priority)
- No intelligent local routing or processing
- Inefficient use of installed capacity There is therefore a need to overcome or ameliorate at least one of the problems of the prior art. In particular there is a need to address the needs of both the network operators and the users in improving the provision of mobile broadband data services.

SUMMARY OF THE INVENTION

In one aspect, the system described herein provides a mobile telecommunications network including a plurality of terminals, a core and a radio access network having a radio device for providing wireless communication resources to the terminals, and further including a processing device for recording information indicative of a movement cycle of one of the terminals through the radio access network and for identifying points within the movement cycle at which there are spare communication resources to provide a list of spare resource points to the terminal to enable the prediction of optimal data transfer points during a subsequent movement cycle of the terminal through the radio access network.

The spare resource points and the optimal data transfer points may include a location element and/or a time element, and may include both a location element and a time element.

The movement cycle may be a pattern movement that is likely to be repeated. For example, the movement cycle may be the movement of a user's device during a 24 hour period. Often a user (and their mobile device) visit the same locations at the same time on several days of the week. For example, on working days a user (and their device) will be located at the user's home during the night, and will commute to work on the same route and at the same time to and from work, and will be located at the user's workplace during the same hours. Movement patterns for the user may be examined over a longer period for the movement cycle to be established. Once a movement cycle is established, then during subsequent movement cycles of the user optimal data transfer point can be predicted.

The radio access network may include a controller (such as platforms described in the embodiments below) that are operable to control the use of network resources by the terminals, and to measure actual spare resource at the current point within the subsequent movement cycle of the terminal and to provide this measurement to the processing device to enable the processing device to determine whether to approve data transfer. The list of spare resource points provided to the terminal enables a prediction of optimal data transfer points in a subsequent movement cycle to be made. However, even if the point of the terminal in the subsequent movement cycle matches the point in the recorded movement cycle (in time and location), the radio conditions may not be the same—for example, because many other users are occupying the cell occupied by the terminal, resulting in increased interference. By measuring the actual spare resource at the current point, it can be confirmed that the predicted optimal data transfer point is indeed optimal.

Spare communication resources may be available in a cell which is subject to a low load. Spare communication resources may be available in a cell which has a particularly high data capacity or which is in particularly advantageous environmental conditions (for example, without obstructions to radio waves). The embodiment, to be described below, refers to a "cost to carry" data. In a particular cell, the greater the spare communication resource is, the lower the "cost to carry" data. Likewise, in a cell, the greater the load on the cell, the higher the "cost to carry" data. Cells may be characterised as low "cost to carry" and not low "cost to carry" (i.e. higher "cost to carry").

The list of spare resource points may be processed by a client on the terminal, and the client may be operable to compare the current point in the subsequent movement cycle of the terminal to the points on the list to identify whether optimal data transfer is likely to be available at the current point. For example, if the current point in the subsequent movement cycle is the same as a point on the list (i.e. if the current point on the list matches time and location, for example), the spare resources points on the list can be used to identify whether optimal data transfer is likely to be available at the current point. This represents a prediction of the operable data transfer.

The client may be operable to identify whether a request for data transfer is a low priority request and, for such a low priority request, only allowing the data transfer if the current point in the subsequent movement cycle is predicted to be an optimal data transfer point. The identification of a low priority request may be by any suitable mechanism. In the embodiment to be described below, a low priority request is identified by a flag from the application that originates the request. However, other mechanisms may also be possible, such as determining the identity of the application from which the request originated. By only allowing the data transfer if the current point in the subsequent movement cycle is predicted to be an optimal data transfer point, data transfer for low priority data requests are only performed when it is predicted that radio conditions are optimal. This is highly advantageous, so that in cells subject to high load, a low priority data request will not compete with higher priority services. This advantageously may have the affect of spreading the load across the network. For data transfer requests that are not identified as low priority requests, the client may arrange for these requests to be performed immediately in the conventional manner. That is, these requests will be performed even if the mobile terminal is in a cell that is predicted to be in a high load state. In this way, high priority data transfers can be performed without delay.

The list of spare resource points may be processed by the client in response to a request for data transfer by an application hosted on the terminal. For example, such an application may request the download of data that is indicated to be low priority. The client then processes the list to determine whether the current point in the subsequent movement cycle is predicted to be an optimal data transfer point or not. If the request for data transfer from the application is a low priority request, data transfer is only allowed by the client if it is predicted that the current point in the subsequent movement cycle is an optimal transfer point. However, it should be noted that even if the client allows this data transfer, in the embodiment to be described, data transfer is only performed for such low priority data if the measurement of the actual spare resource at the current point within the subsequent movement cycle confirms that the actual spare resource in the relevant cell is above a threshold value (or, likewise, that the load of the relevant cell is below a threshold value).

The processing device may be operable to record communication activity of the terminal within the movement cycle, and to predicted at what point communication activity will occur in the subsequent movement cycle and to instruct the client to request data transfer to perform the communication activity at a predicted or optimal point within the subsequent movement cycle. For example, when generating the list of spare resource points, this list may also include the points at which communication activity occurs. Often there is a patent to communication activity throughout a movement cycle. For example, a user may access particular websites at a particular time of day. In an example to be described in the embodiment, the user accesses an on-line newspaper at a particular time each day. Advantageously, the communication activity is recorded and can be used to predict that the user is likely to download the on-line news paper at the same time in a subsequent movement cycle. The client can then be instructed to request the download of the on-line news paper at an optimal point within the subsequent movement cycle. For example, if the user request download of the on-line newspaper at 7 am everyday, this may in fact be at a point within the movement cycle when the user in the cell of high congestion—such as at a busy railway station. The client may analyse the list to determine optimal data transfer points before 7 am (at which the user typically accesses the on-line newspaper). The client may determine that optimal data transfer points exist between 2.30 am and 6.30 am, and may automatically request download of the on-line newspaper at such a point. In this way, the user is provided with the on-line newspaper on request and when in a cell subject to high load but without consuming any communication resources in that cell.

The network may include data transfer device operable to adjust the content of the data for transfer, for example, in dependence upon the actual spare resource. For example, the content of the data may be adjusted in dependence upon the bandwidth available.

The system described herein is particularly advantageous for the efficient transfer of low priority data, such as "background" data. Such data may be data that a user routinely accesses. Also, such data may allow files to be backed up from the user's mobile terminal. The system described herein is relevant to low downloading and uploading data.

The radio access network may include a plurality of radio access technologies such as 2G, 2.5G, 3G, 4G, femto cells and WiFi.

In another aspect, the system described herein further provides a mobile telecommunications network including a plurality of terminals, a core, a transmission network and a radio access network having a radio device for providing wireless communication resources to the terminals, and further including a processing device for recording information indicative of a movement cycle of one of the terminals through the radio access network and for identifying points within the movement cycle at which there are spare communication resources to provide a list of spare resource points to the terminal to enable the prediction of optimal data transfer points during a subsequent movement cycle of the terminal through the radio access network. The transmission network may be a backhaul connection between the radio access network and the core.

In other aspects, the system described herein also provides a telecommunications method for performing steps of the system described herein and a non-transitory computer readable medium storing software with executable code for carrying out the steps of the system described herein.

BRIEF DESCRIPTION OF THE DRAWINGS

Embodiments of the system described herein will now be explained in more detail with reference to the accompanying Figures in which.

In the drawings like elements are generally designated by the same reference numerals.

DETAILED DESCRIPTION OF VARIOUS EMBODIMENTS

Certain elements of a 3G mobile telecommunications network, and its operation, will now briefly be described with reference to FIG. 1.

Each base station (e.g. Node B 1 and Femto 2) corresponds to a respective cell of the cellular or mobile telecommunications network and receives calls from and transmits calls to a mobile terminal (not shown) in that cell by wireless radio communication in one or both of the circuit switched or packet switched domains. The mobile terminal may be any portable telecommunications device, including a handheld mobile telephone, a personal digital assistant (PDA) or a laptop computer equipped with a network access datacard.

The nodeB 1 or Femto 2 can be considered to comprise two main parts: a radio frequency part and a baseband part. The radio frequency part handles the transmission of radio frequency signals between the antenna of the nodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a CDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) 5 in the Packet Switched Core Network. In FIG. 1, Node B 1 is controlled by RNC 3 across the Iub interface. An RNC may control more than one node B.

Figure 1:
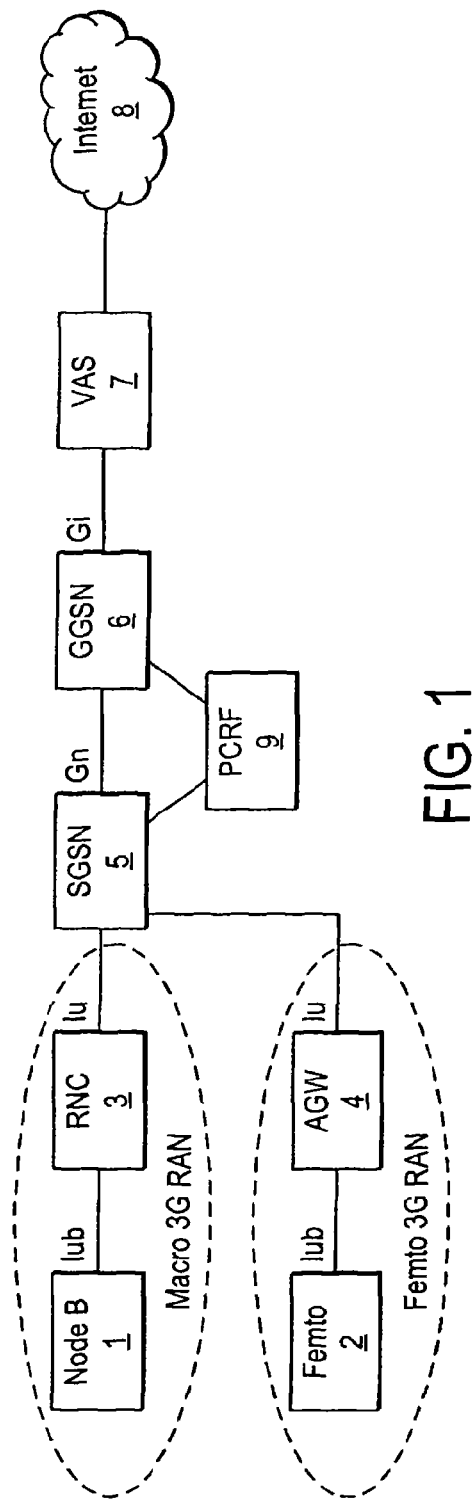
FIG. 1 illustrates a high level packet data network architecture, useful for explaining the prior art and embodiments of the system described herein.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25 m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 would typically be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 may be IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted therebetween by IP transport/DSL transport. The Femto or AGW converts the cellular telecommunications transport protocols used between the mobile terminal and the Femto 2 to the appropriate IP based signalling.

The femto 2 may be connected to the AGW by other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register. The GGSN is responsible for IF address assignment and is the default router for the connected mobile terminal. The GGSN also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes in particular, a PCRF (Policy and Charging Rules Function) apparatus 9 is also provided, in communication with both the SGSN 5 and the GGSN 6.

The SGSN 5, GGSN 6, VAS 7 and PCRF apparatus 9 comprise the core network of the mobile telecommunications network.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Data in a mobile telecommunications network can be considered to be separated into "control plane" and "user plane". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the internet. That is, all data is directed from the applicable RAN through the core network components SGSN, GGSN and VAS before reaching the internet. All PS traffic accordingly follows the same path and therefore has the same network costs. All applications are processed on the client (on the mobile device) or on the server (which is connected to the internet), and the network core therefore acts like a bit-pipe in the current architecture. For data, where the mobile network operator cannot add any value by carrying it on its own backhaul transport, core transport or cellular core infrastructure (the core network), such as data destined for the public internet without required intervention from the core network, there is no benefit to routing this data via the core network.

However, a large percentage of this traffic can be handled in a more intelligent manner for example through content optimisation (Video & Web), content caching, or locally routed or directly routing content to the public Internet. All these techniques reduce the investment required by a mobile operator to carry the data on its own backhaul and core transport or cellular core infrastructure.

In order to offer low cost packet data, to support new services and to manage customer expectation, a step-change reduction in the end-to-end cost per bit is required.

Mobile operators want to reduce their packet data handling costs through alternate network architectures based on commoditised IT platforms, breaking away from the traditional architecture based on their voice legacy. These new network architectures overcome the Access architecture issues of today In order to successfully offer cheap packet data and be able to compete with the fixed broadband offers (flat fee) a solution is proposed which focuses on the reduction of the end-to-end cost per bit, especially for Internet access service.

This enables mobile operators to reduce packet data handling costs using an alternative network cost model architecture, which breaks out of the traditional network architecture and nodes and utilises lower cost transport networks to optimise the data flow.

Figure 2:
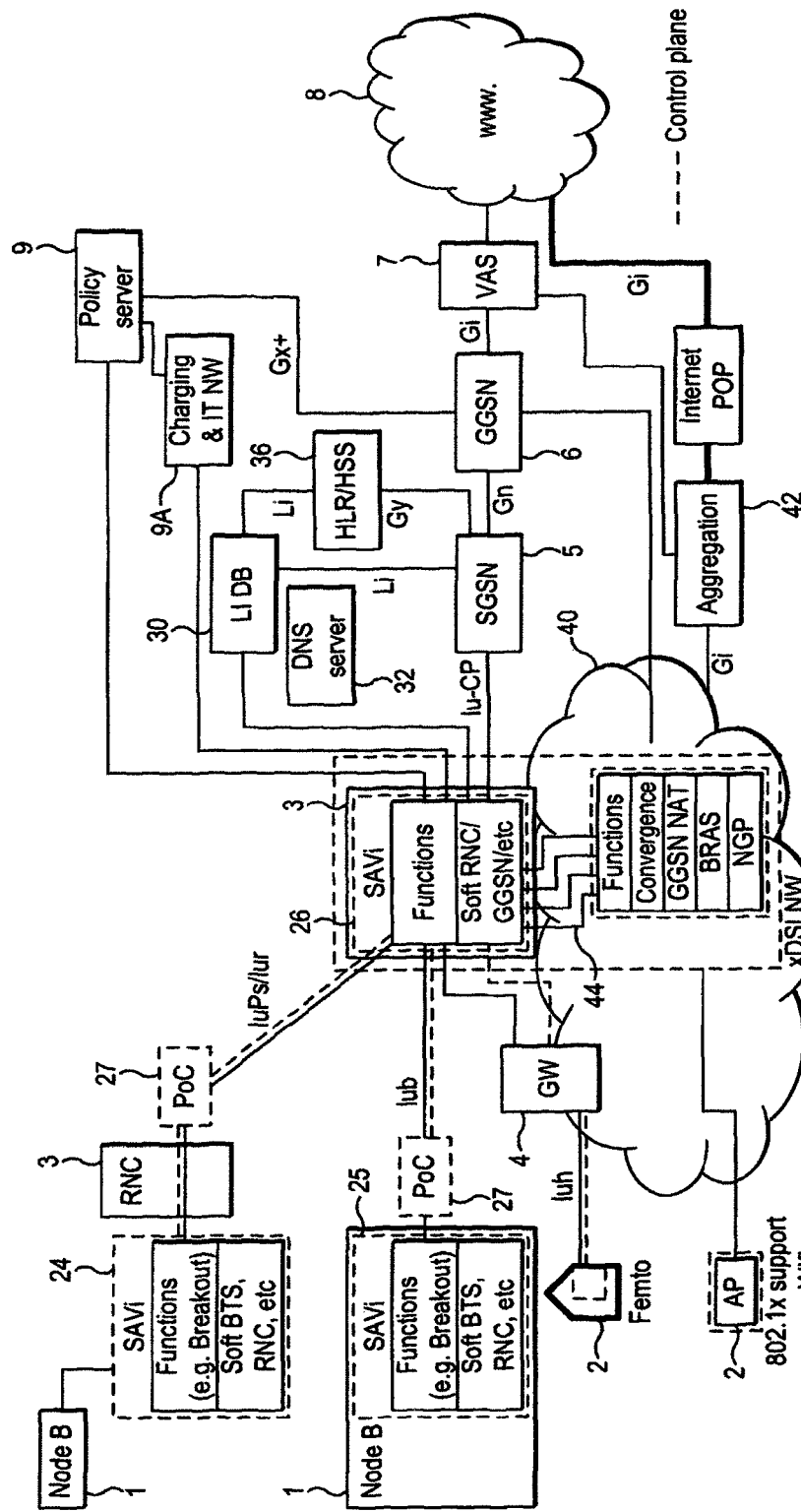
FIG. 2 illustrates the introduction of a new functional "platform" in a 3G network according to an embodiment of the system described herein.

In this regard, FIG. 2 shows a high level description of the architecture that may be adopted to deploy this on a 3G network.

According to this arrangement, novel "platforms" 24, 25, 26 for performing functions such as caching, routing, optimisation and offload/return decision functionality are integrated into the network. This decision functionality may be incorporated in the radio architecture. In this regard, the platforms 24, 25, 26 may be incorporated into the NodeBs 1 (25), RNCs 3 (26) or exist as separate physical entities (24). It is these platforms 24, 25, 26 that, for example, determine the path of communications originating from the mobile terminals.

The exact placement of the platform 24, 25, 26 is not essential, and, for a macro 3G network, it can be placed at or between the Node Bs and the RNCs, and also between the RNCs and the SGSNs (or any combination thereof). It would also be possible to place the platform 24, 25, 26 at the GGSN (although not the SGSN as this does not control user data, only control data).

In the 3G Macro network, the aim is to offload a high percentage of the macro network traffic from the core and transport (IuPS, Gn, etc) by diverting specific traffic type for certain user(s) class directly to the Internet.

Where the platform 24, 25 is located in the Node Bs (or on the Iub interface), it may be possible to redirect the data from all the remaining mobile network elements (e.g. the RNC, SGSN, GGSN and VAS for macro 3G), and sending the data directly to the Internet 8. In a similar manner, where the platform 26 is located at the RNC (or on the Iu interface), it becomes possible to redirect the data from the SGSN 5, GGSN 6 and the VAS 7. The alternative data route may be a DSL using ADSL.

It is also possible to aggregate the alternative data routes for each cell, where applicable. In this regard, each cell will have at least one RNC 3 and a plurality of Node Bs, so where the decision blocks are situated at or in the vicinity of the Node Bs, for instance, there will be a plurality of links which should ideally be aggregated before being passed to the Internet 8. At the point of this aggregation 42, there may be a further decision block which enables data to be returned to the legacy route. For instance, a new policy rule may have been implemented, which requires or enables previously offloaded data to be returned to the core network route. This new policy rule may be communicated to the return decision module by the core network policy module. In FIG. 2, this returning of data is only shown to the VAS 7, but the data may be returned to one or more of the other core network elements.

Each of the NodeBs 1 is connected to the mobile network core through a Point of Concentration (PoC) 27. All traffic from the NodeBs 1 which is to be routed through the core mobile network is routed to the PoC 27. This includes both user plane and control plane data. On the control plane level, the PoC 27 routes data to and from the SGSN 5 and the GGSN 6. Control data is also sent to and from other core network components, including the Lawful Interception Database (LI DB) 30, DNS Server 32, Policy Server 9 (including Charging rules and IT Network 9A) and Home Location Register/Home Subscriber Server (HLR/HSS) 36 (which contains subscriber and device profile and state information).

User plane data is transmitted by the PoC 27 to the SGSN 5 and the GGSN 6. From the GGSN 6, data is routed across a VAS 7 node to the Internet 8. In 3G this is the standard data path from the mobile terminals to the Internet.

To implement an advantageous feature, an alternative path on which to re-route certain data to the internet 8 is provided, whereby, each NodeB 1 and Femto 2 may be connected to a fixed line connection 40 (e.g xDSL) which is directly connected to the internet 8. These xDSL connections may be made directly to the NodeB and/or Femto or made to the NodeB/Femto via other components, such as the PoC 27. In FIG. 2, the xDSL Network 40 may be a third party network or may be a network owned or controlled by the owner of the mobile telecommunications network. By using such an alternative path, radio capacity, backhaul transport resource, core transport resource, cellular core network resources can be saved as well as improving performance and enhancing revenue for the mobile network operator.

As each Node B 1 and/or PoC 27 is associated with a platform 24, 25, 26, for each data packet request originating from a mobile terminal, a decision at the platform 24, 25, 26 is made as to whether the traffic may bypass the core mobile network entirely or may be passed into the core mobile network. The location at which the traffic is routed towards the internet may beat the platform 24, 25, 26; however, it may alternatively be routed out from the core network towards the internet at a different component. Traffic offloaded from the macro network is routed by the platform 26 to the xDSL network 40 by link 44 (the decision to offload this traffic may have been made at platform 24, 25 or 26—although the decision is implemented at platform 26)

Figure 3:
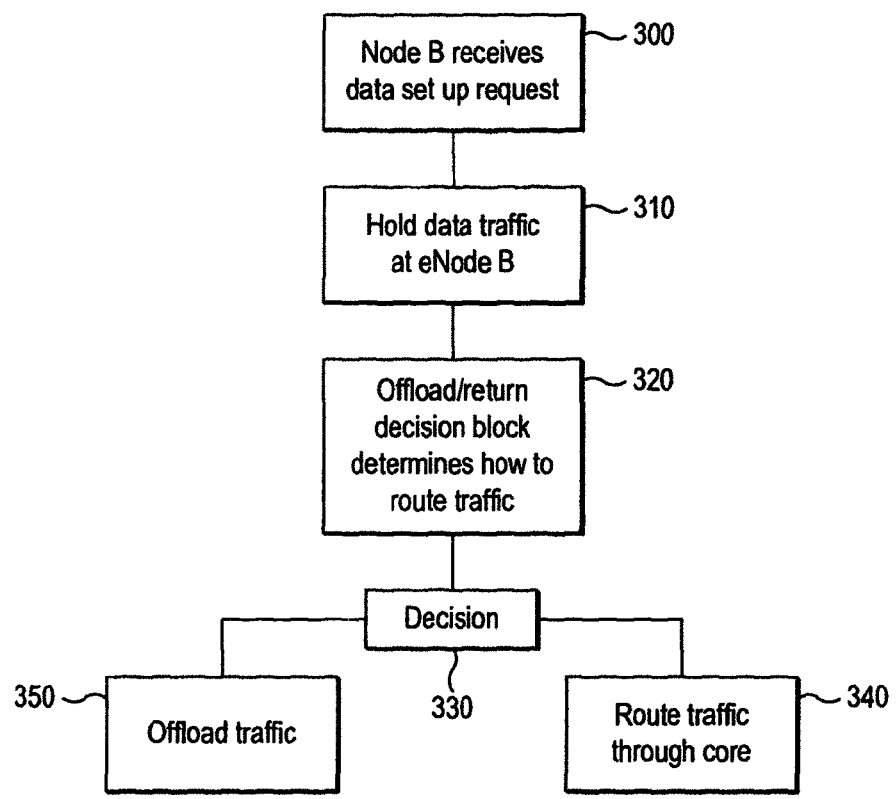
FIG. 3 illustrates a flow chart of an example offload decision process as implemented in the 3G network of FIG. 2.

The Offload/Return decision may be dependent upon the type of data or user. To exemplify this feature of the embodiment, FIG. 3 is a flow diagram showing the steps taken when deciding how to route the traffic in the architecture of FIG. 2. For instance, consider an NodeB receives a request to set up a data call from a user device which is camped on the NodeB at 300. Once the NodeB has identified the request as a data call and the type of traffic/user, rather than automatically routing the data traffic to the core network, the data request is held at the NodeB at 310 until a decision has been made as to how to route the data, in particular whether to offload the traffic directly to the internet or whether to return the data through the core mobile network. The signalling (control plane) for the connection may continue through the normal route but the user data traffic will be held at the NodeB, this is possible by virtue of the separate user and control planes, as shown in FIG. 2.

The decision as to whether or not to use the Core mobile Network to route the data traffic can be based on various aspects, particularly relating to the properties of the data being routed and/or status of the user routing the data.

The Mobile Network may add value to traffic by providing a number of services, such as compressing the user data to speed-up the data transfer while downloading (if this functionality is not already supported by the platforms 24, 25, 26). These different services can be broken up into groups and provided by different entities (e.g. this enables greater flexibility in the provision of the services, such as the mandated Internet Watch Foundation—IWF—requirement, which can only be supported by the mobile operator). The platforms 24, 25, 26 therefore make a decision on whether to service the data locally through caching, fetch the data from other node or from the internet via offload functionally or whether to route the traffic through the core network, based on the applicability of one or more of the services to the traffic. That is, platform 24, 25, 26 decides when data traffic requires one or more of the services and when it can do without them.

It should also be noted that these services are ones that could be provided without using the core network. These are services that add value to the customer, and which subscribers will pay for (explicitly or implicitly).

Referring again to FIG. 3, the platform 24, 25, 26 decides at 320 what to do with the traffic (from coming for the network/internet or orientated by the device). This decision may be made by interrogating certain servers or databases stored centrally within the core network which can compare the type of service, type of user etc with criteria which identifies the type of action shall be considered, e.g whether the traffic is suitable for offloading directly to the internet (at 330) from the NodeB or whether the traffic should be routed through the core (at 340). Examples of some of the considerations used in influencing the decision of whether to offload the traffic are discussed below in more detail. The implementation of this data offload technique needs to be carefully considered, as it places additional constraints on the network design.

The following is a non-exhaustive list of examples of challenges that have to be considered when implementing the data offload technique:
  a) maintaining Customer Services provided by the core network or otherwise;
  b) maintaining Network Services (e.g. Charging Rate Limiting/application control); and
  c) maintaining Regulatory Services (e.g. to enable Lawful Interception and Regulatory Content Filtering).

Some specific examples of Customer Services that can be taken into account by the offload decision module include:
  i) Parental Control: A service which customers subscribe to that filters content in order to shield children from unwanted websites and programs. Whether traffic from a given user needs to be filtered can be determined by a Common User Repository (CUR) lookup, where the CUR stores user profile information, such as whether the user is an adult or a child etc. If traffic needs to be filtered, then either the traffic cannot be offloaded or it needs to be filtered somewhere other than the core network.
  ii) Traffic Optimisation: Optimisation is only required for low bandwidth connections (2G). By looking at the Radio Access Type (RAT) and the International Mobile Equipment Identity (IMEI) it can be determined whether or not a subscriber needs these services. Where traffic optimisation is not required, the traffic can be offloaded
  iii) Marketing Proposition: The mobile network is typically setup to provide full mobility with acceptable Quality of Service (QoS). A further option could be to offer best effort QoS without guaranteed full mobility. As an example, for when a heavy user has exceeded their fair usage limit, their traffic could be designated as low priority traffic and offloaded.

The Network Services that can be taken into account by the offload decision module are typically those that the network operator needs to manage its network. Some examples include:
  i) Charging: The charging plan that a user subscribes to can be used to determine whether or not to offload that user's data. For instance, it is most easily avoided when the customer has a flat rate plan. That is, users on flat rate plans do not need their usage tracked for charging purposes in real time and so can be offloaded onto the alternative route. For users who are roaming or whose charging plan depends upon usage, then, the operator/supplier needs to track their total usage in real-time, and so their data needs to be maintained on the core network route so that rate-limits and data usage can be accurately tracked and alarms/alerts activated when usage exceeds allowances. This is because, if this is not avoidable then Call Data Records (CDRs) need to be generated by the module for the real time charging.
  ii) Rate-limiting/application control: This is currently used to manage the traffic flow according to a certain usage policy. Excessive bandwidth usage or controlling P2P applications are common reasons to rate limit users. Therefore, where a user transmitting data is determined to be under a rate restriction (i.e. throttling) or the data they are transmitting has an application restriction (i.e. the application is blocked), then that data can be offloaded. This exceeded allowance information would typically be communicated to the decision module (24, 25, 26) by the HLR/HSS. This traffic management enables the total traffic volume to be reduced and is typically fully managed by the network operator.
  iii) QoS: The network uses QoS to manage traffic during high load situations and to support marketing propositions. To enable QoS considerations to be enforced by the offload decision module, a connection is established between the offload module and the Policy and Charging Rules Function (PCRF) entity. This enables decision criteria to be dynamically fed to the offload module, for instance to maintain high priority users on the core network path and/or high priority application types, such as VoIP. It is to be appreciated that the connection to the PCRF is not essential, and alternatively, static or semi-static rules, pre-stored with the offload module, can be considered.
  iv) Mobility: Mobility, such as cell handover, is an issue that needs to be managed by the core network. Therefore, terminals that are in motion should not be offloaded. The mobility of a mobile terminal could be determined by querying the Node B. Some users could be provided with a contract that allows only fixed or limited mobility use, so that the service provided was equivalent to a fixed broadband package. Different charging tariffs could be applied depending on whether a user was at a fixed location or mobile. Two ways the offload decision module can handle a mobile terminal's mobility are as follows:
  1. The offload decision module can have the capability to characterise the radio link between the device and the network by monitoring the number of handovers implemented for the mobile terminal. If a certain number of handovers occur over a fixed duration, the mobile terminal can be classified as in motion, and any data from the mobile terminal can thereafter be routed back into the core network to avoid any further packet data delay. This of course assumes that the mobile terminal had been designated for data offload on the bypass link.

2. The offload decision module is situated on the JuPS for the 3G network (i.e. between the RNC and the SGSN) or S1 for the LTE (i.e. between the eNode B and the PoC), and checks the Iur or X2 signalling information (i.e. between a set of RNCs controlled by a given 3G SGSN and between a corresponding set of eNode Bs for LTE). If this monitoring shows that a mobile terminal is hopping between cells one of which is not connected to (and therefore managed by) the offload decision module, any data from the mobile terminal can thereafter be routed back to the legacy path through the core network.

Regulatory Services are services that are mandated by legislation, and are typically provided to all traffic. Some specific examples of Regulatory Services that can be taken into consideration by the offload decision module include:

i) Lawful Interception (LI): The ability to provide Lawful interception will be maintained in any offload or local breakout plans. The options for offload are:

Maintain the evaluation of LI in the core network, and not offload users whose traffic needs to be intercepted (e.g. where the user has been tagged by the police for communication interception). Since the LI functionality is handled by the core network, the core network accordingly cannot be bypassed;

Add LI capability to the offload decision module, which will require a local LI interface with a dedicated database identifying the users to be intercepted. With this option, upon identifying traffic from a user on the list, a copy of the data can be made at the local LI interface and the traffic offloaded. The copied data can then be reported to the appropriate authorities; or Alternatively, LI may be performed at the Internet Service Provider (ISP). With this option, since LI is considered at the ISP it is not a consideration at the offload decision engine, and so the data may be offloaded, where possible. However, to effect this option, a Service Level Agreement (SLA) with relevant ISP providers may need to be amended in order to include the support of LI in the ISP network rather than in the mobile network infrastructure.

ii) Regulatory Content Filtering (e.g. for Internet Watch Foundation (IWF)): This required functionality blocks illegal websites. This functionality could easily be added to the offload decision module as it is not processor intensive. An http proxy server, for instance, could be used to support this functionality. Otherwise, the traffic will be returned back to a dedicated core node(s).

A further criterion that the platform (24, 25, 26) module may consider is the priority of the customer. In this regard, a network operator may wish to prioritise traffic across its network based on the priority level of the customer. For example, a high value customer (e.g. a corporate customer or a subscriber with on a high tariff contract) may be given priority over a low value customer. In this situation, a network may decide to offload lower value customers directly to the internet. This is related to the QoS criterion mentioned above, although the QoS criterion is generally linked to traffic management to maintain a balanced network, whereas the priority referred to can be used to ensure subscribers get a level of service commensurate with their service agreement.

The embodiment of FIG. 2 is in relation to a 3G network. Embodiments of the system described herein are equally applicable to 4G (LTE/SAE) networks.

The LTE/SAE macro network includes eNode Bs which make up the RAN. The eNode Bs effectively combine the functionality of the node B and the RNC of the 3G network. These eNodeBs are the network components which communicate with the mobile communication devices. It is envisaged that the eNodeBs will be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

The platforms would operate in the same manner as described in relation to the 3G network. The platforms may be located at many different locations in the 4G network.

Figure 4:
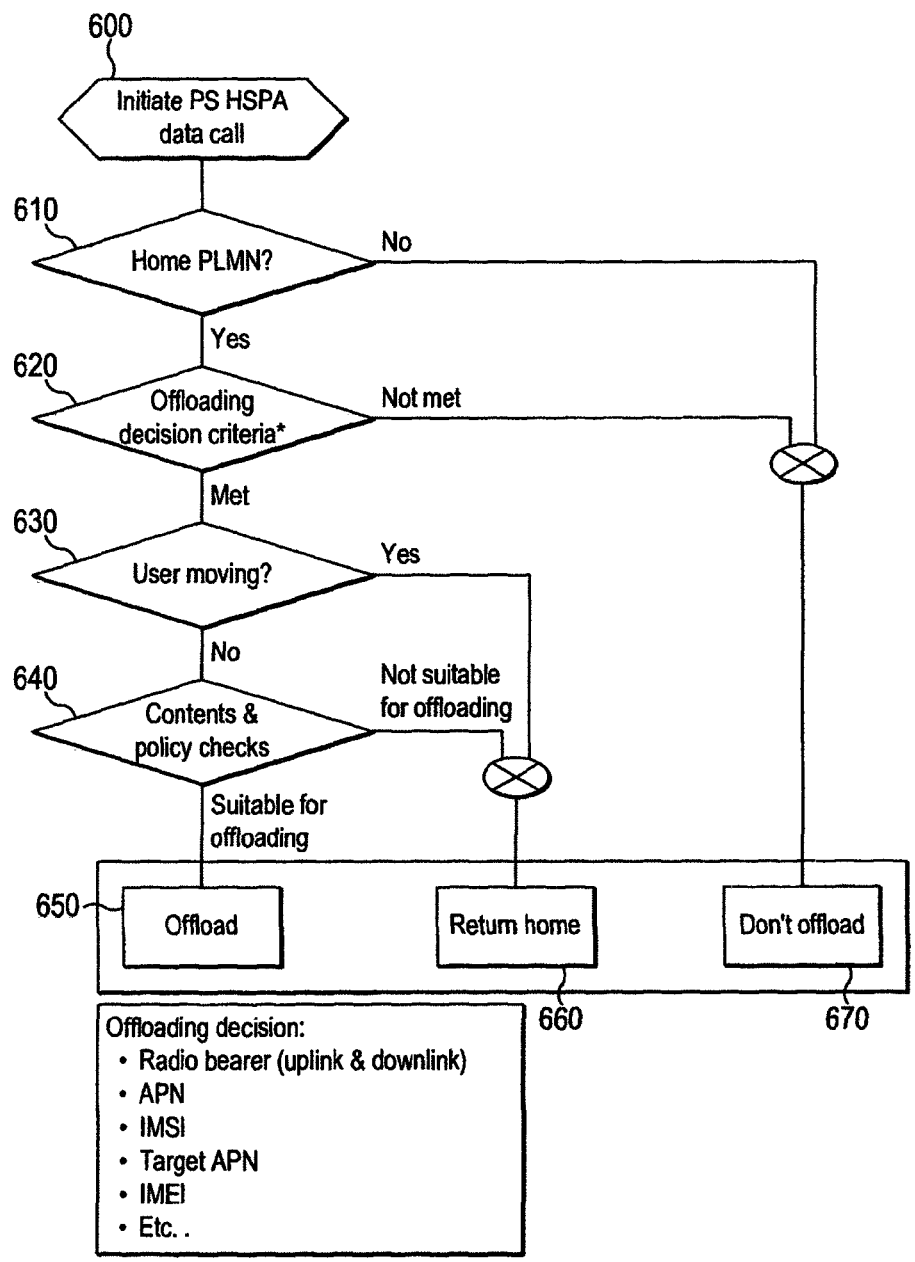
FIG. 4 illustrates a flow chart of an example offload decision making process that may be implemented by a redirection module according to an embodiment of the system described herein.

A more specific example of how the platform 24, 25, 26 may be implemented is described in relation to FIG. 4. FIG. 4 is a flow diagram illustrating an embodiment for a method for deciding whether to offload data traffic to the internet. The decision structure is composed in a hierarchical form in order that certain types of user or data are always directed through the core network. The example of FIG. 4 is described for a 3G network but it will be clear to those skilled in the art that these decisions could be applied to any type of radio access technology.

Once a PS HSPA data call (or other connection) is made and received at the Node B at 600, a primary consideration by the platform 24, 25, 26 at 610 is whether the device is operating on its home network or whether it is roaming. If the device is roaming then all traffic is automatically routed through the core network. The reason for this is that the home network would want to guarantee the security and accurate billing (due to different charging principle between home and visited operator) of the user's traffic. The platform 24, 25, 26 at 610 will also consider other factors, such as what application types running on the mobile terminal require connections. If the mobile device is operating on its home network at 610, or if the applications do not require a connection to the core network, the platform 24, 25, 26 considers secondary offloading criteria at 620. Examples of secondary criteria may include the functions required by the device, the radio bearer currently used by the device, the APN, or the priority level of the customer identified, for example, through IMSI, IMEI or the target subscriber. If the offloading criteria are met at 620, the decision moves to the tertiary criteria, otherwise, the traffic is not offloaded.

At 630, the system checks the mobility of the user. If the user is moving, he is considered not suitable for offload due to an expected interruption delay of the user data when moving between source and target cell.

Finally, at 640 the system conducts a contents and policy check to confirm whether the user is suitable for offload. If it is determined that the user is suitable for offload to the internet, the eNodeB offloads the traffic to the internet at 650. If it is determined that the user is not suitable for offloading to the internet at 640 then the procedure returns "home" at 660. A connection is provided by a network core in a conventional way and the tests of the flowchart shown in FIG. 4 are repeated periodically to determine whether offloading directly to the internet becomes possible subsequently.

If the device is determined to be roaming at step 610, then the device is not offloaded directly to the internet, but remains connected via the network core in a conventional way at 670. Similarly, if the offloading criteria are not met at steps 620, the mobile device remains communicating via the network core in the conventional way, again at 670.

The hierarchical decision method is useful because it reduces the number of challenges across the network. It will be evident to those skilled in the art that different hierarchical structures will be appropriate for different networks, different conditions etc and that the example of FIG. 4 is just one way the decision could be made.

For instance, whilst arrangements have chiefly been described in relation to transmitting data traffic from a mobile terminal to a data network, the principles may also be applied to transmissions from a data network towards a mobile terminal.

In the arrangements described above the decision regarding the route is said to be made at call set-up. However, it should be appreciated that a decision to change the routing of data may be made at the beginning of a communication session (for example establishment of a PDP context), or during a communication session. The routing of data may change several times during a single communication session. For example, when a communication session is initiated it may be detected that the user is not moving, in which case a decision will be made to offload the data over the alternative data route. Subsequently it may be detected that the user is moving, and at this point a decision may be made to beginning routing data for the communication session via the mobile network. During the communication session, the mobile terminal may become stationary for a prolonged period of time again, and at this time a further decision may be made to send subsequent data during the communication session via the alternative data route. Subsequently again, the user may then attempt to access age-restricted content, and it will be detected that parental control is required. In response for the requirement for parental control, a decision may be made to redirect subsequent data during the Communication session via the core network so that core network parental controls can be applied.

It is to be appreciated that the present embodiments of the system described herein are to be distinguished from HSDPA offload, a technique used on the Iub interface between the Node B and the RNC. HSDPA offload which serves to separate data traffic from voice traffic, so that non-real time data traffic is sent down a less expensive backhaul to complement or replace the expensive E1/T1 TDM backhaul link between the two. Once this diverted traffic reaches the RNC, however, it is returned to the cellular and transport core networks and there is no differentiation made based upon data traffic type.

In the arrangement described above the platform 24, 25, 26 primarily handles data offload decisions. As will be described below, the platform can perform may other functions.

Figure 5:
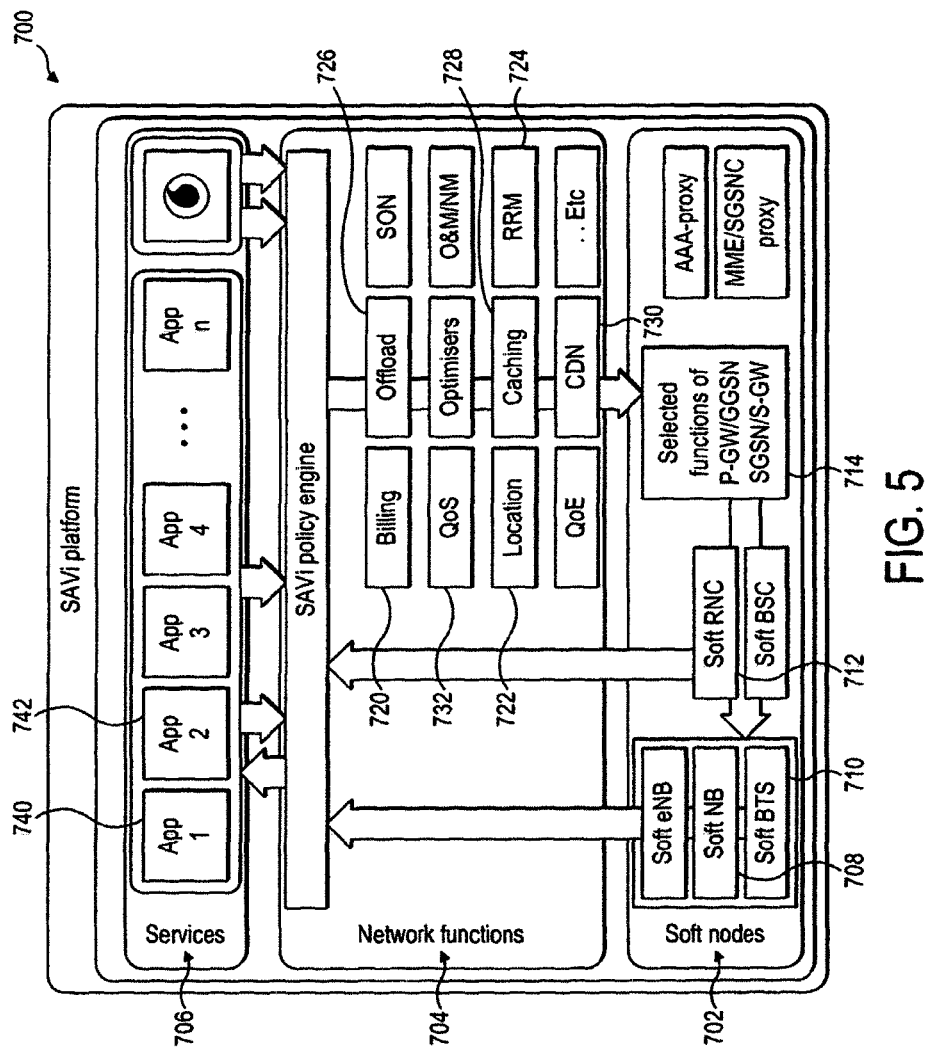
FIG. 5 shows the novel "platform" in more detail provided in the Radio Access Network in accordance with an embodiment of the system described herein.

Embodiments of the system described herein in which the Radio Access Network controls the use of resources by mobile terminals will now be described, Platform Architecture As discussed above, a mobile telecommunication network is modified by the introduction of a "platform" 24,25,26. Such a platform is shown in more detail at 700 of FIG. 5 and which includes three principal parts: soft nodes 702 (physical/transport layer), network functions 704 and services 706 (application layer).

The platform 700 communicates with the radio frequency (RF) part of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

The network functions part 704 of the platform 700 includes modules for performing functions similar to those performed by the core network of a mobile telecommunications network, such as billing 720, location tracking 722 and the radio resource management (RRM) 724. The network functions may further comprise an offload decision module 726 that performs a function similar to the offload decision modules 24, 25 and 26 described above. The network functions part 704 may further comprise a caching function 728 and Content Delivery Network function 730.

The network functions parts 704 of the platform 700 provides an Application Programming Interface (API) framework to the services part 706 of the platform 700. The services part 706 of the platform supports a plurality of applications 740, 742 etc.

The network functions fall into three main categories, those that enable the network operation (e.g. charging, O&M), those that support service operation (e.g. Location) and those that optimise the usage of the network by certain applications and services (e.g. Caching, Video Optimisation).

The applications supported on the Platform 700 are the entities that supply or demand the flow of data on the network, akin to a server on the internet, e.g. gaming server, navigation server.

The API is implemented by a software program running on the network function part 704 which presents a novel standardised interface for the applications 740, 742 etc of the services part 706. The novel standardised API provides a consistent interface, defining communication protocols, ports etc. Full details of the API may be published to allow a multiplicity of applications to be developed for the platform 700 by multiple developers. This should be contrasted with prior art arrangements where each component of a mobile telecommunications network (such as BTS, BSC/RNC, SGSN etc) is proprietary and tends to have a unique interface, meaning that a different application must be written for each node of a conventional network.

The applications 740, 742 etc may provide services to users of the telecommunications network by co-operating with other parts of the platform 700.

The details of the use of each application used by the a user of the mobile telecommunications network is stored in an application context/container. The Application context contains application names, protocol used to carry such application, their characteristics that are measured/reported over period of time and some statistical information about these applications (volume, number of users using these applications, etc.).

Figure 6:
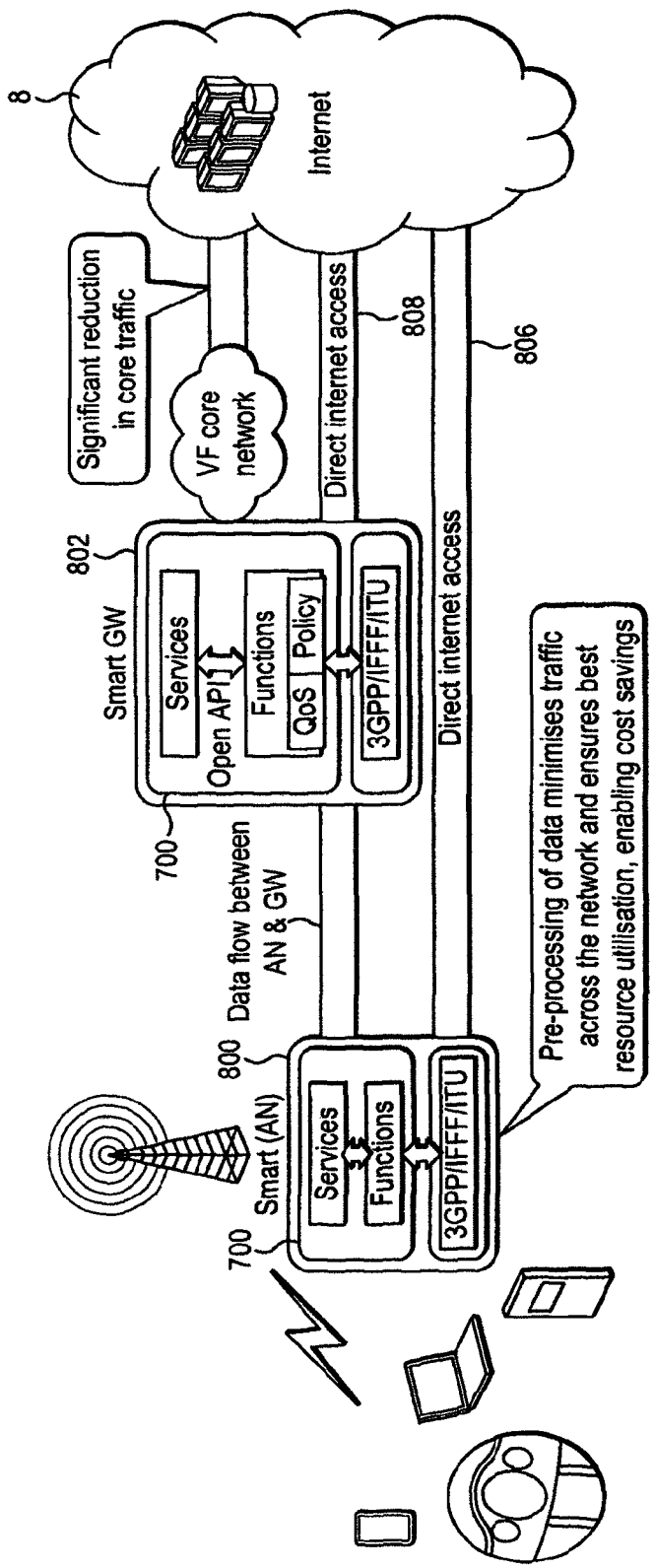
FIG. 6 shows possible locations of the platform within a mobile telecommunications network according to an embodiment of the system described herein.

As shown in FIG. 6, a platform 700 may be provided at each base station of the mobile network (where it is connected to the radio frequency part of the base station—NodeB 1 in FIG. 2), forming an access node 800. Platform 700 may also be provided at the RNC (item 3 in FIG. 2) where it forms a gateway 802. The access node 800 and the gateway 802 are both configured to communicate directly with the network core 804 (for example, comprising the SGSN 5, GGSN 6 and VAS 7 (as shown in FIG. 4)). The access node 800 and gateway 802 may also be connected to the internet 8 for direct internet access via direct links 806 and 808, respectively, such that at least a portion of the core network 804 is bypassed in the manner described above.

The following are examples of access technologies that can be provided within the access node 700:
3GPP: GSM/GPRS, UMTS/HSPA & LTE
IEEE: 802.11 family & 802.16 family
ITU: DSL, ADSL, VDSL, VDSL2

Allocation of Functions to Platforms

Figure 7:
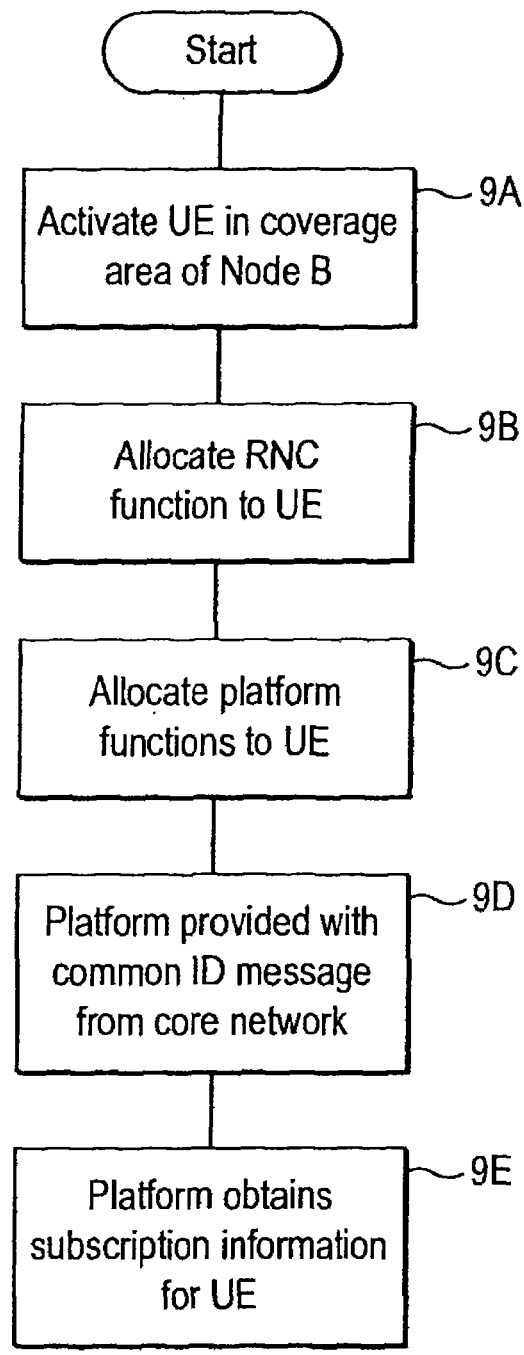
FIG. 7 is a flow chart showing the steps performed when a mobile terminal is activated according to an embodiment of the system described herein.

The steps performed when a mobile terminal is activated at a NodeB, at the Femto or at the Access Point (AP) of the network which includes the novel platform 700 will now be described with reference to FIG. 7. At step 9A the mobile terminal (UE) is activated within the coverage area of a particular NodeB, at the Femto or at the AP. The access part of the NodeB, at the Femto or at the AP communicates information from the mobile terminal to the platform 700 associated with the NodeB, at the Femto or at the AP. At step 9B the platform 700 then allocates the baseband NodeB, at the Femto or at the AP function and the RNC or BRAS (Broadband Remote Access Server) function either at access node 800 at the NodeB at the Femto or at the AP site or at the gateway 802 at the RNC or BRAS site of the network or even from neighbouring nodes that have spare resources to pull. The decision as to whether the RNC or BRAS function is allocated at the platform 700 of access node 800 or the gateway node 802 may be made depending on various criteria, including:

- The device type—for example this decision can be based on the radio access capabilities that the mobile terminal indicates upon activation, such as whether it is operating in the circuit switched or packet switched domains.
- The location of the mobile terminal. If the mobile terminal is near the edge of the cell (which can be determined by network power measurements or neighbour cell measurements from the mobile terminal, within a plus or minus 3 dB range for the RACH).
- The establishment cause of the connection request: such that the NodeB can filter the unnecessary signalling information from the mobile terminal which is not critical—for example periodic routing area update messages.

Upon allocating the baseband NodeB at the Femto or at the AP and the RNC or BRAS function, the NodeB at the Femto or at the AP may allocate the mobile terminal to a particular carrier dedicated to the RNC or BRAS function.

Once the RNC or BRAS function is allocated to either the access node 800 or the gateway 802 at step 9C, other functions performed by the platform 700 at the access node 800 (or other access node) and the gateway 802 (or other gateway) are allocated to the mobile device. All other platform functions may be provided by the platform where the RNC or BRAS function is allocated to the mobile terminal. However, a platform at a different location to that which provides the RNC or BRAS function to the mobile terminal may provide some or all other functions.

At step 9D the platform which is allocated the RNC or BRAS function is provided with a Common ID message from the core network 804.

At step 9E, this message is used by the platform 700 to look up the complete subscription information for the mobile terminal, as well as the resource requirements (QoS) of the services required and negotiated PDP context, this information being provided by the core network 804.

The subscription information relating to the device that is obtained from the central nodes (e.g, core network) 804 is used to allocate the other functions at access node 800 and/or the gateway 802 in dependence upon various factors, including:

- Detailed information regarding the mobile terminal type obtained from the core network.
- The subscription characteristics of the mobile terminal.
- The applications previously used most frequently by the mobile terminal.
- The characteristics of the applications previously used by the mobile device and the performance requirements thereof.
- The historic mobility of the mobile terminal (speed, connection, distance travelled etc).
- The location of the mobile terminal and the likely destination of traffic from the mobile terminal based on historic usage patterns.
- The load of the NodeB providing RF services to the mobile terminal, and the historic traffic trends at that NodeB at Femto or at AP.
- The characteristics of the NodeB at the Femto or at the AP providing RF services (for example, the location, what other devices are connected through the NodeB at the Femto or at the AP, the number of machine to machine devices being attached and served by the NodeB, etc).

As mentioned above, a single mobile terminal may have platform functions/applications allocated on a plurality of platforms. Generally, when a mobile terminal is near-stationary it is most efficient for its functions/applications to be served from an access node 800 (i.e. distributed), whereas mobile terminals with greater mobility (or lower anticipated cell hold times) will be most efficiently served by having fewer or no functions/applications served from the access Node 800, and more or all functions/applications served from a gateway 802 (i.e. centralised). The assignment of functions/applications to a mobile terminal between an access node 800 and a gateway 802 will also depend upon the characteristics of the service type provided by the application (for example, the average IP session duration, the popularity of the particular application, the average mobility of mobile terminal using the service provided by the application etc).

Traffic management may be performed at the access node 800, where there is access to real-time radio information from the radio frequency part of the NodeB, the Femto or the AP serving the mobile device.

Centralised Radio Resource Management (RRM) may be provided at the gateway 802, and maintains performance across different access modes 800, which may have different radio access technologies, frequency bands, coverage etc. The RRM function 724 of the platform 700 of the gateway 802 may obtain information regarding radio traffic management from each access node 800 to dynamically position subscribers to particular radio technology. This technique will be used to allocate network resources based on the resource availability, application used and user mobility, For example, the traffic management information may be provided by the soft NodeB 708, Femto or AP of the platform 700 at the access node 800. This soft NodeB 708 obtains radio information relating to the mobile terminal from the radio frequency part of the NodeB to which the mobile terminal is wirelessly connected.

For a particular mobile terminal, functions provided by an access node 800 and gateway 802 may be coordinated to work together in an advantageous manner (i.e. a hybrid or distributed arrangement). For example, the gateway 802 may set operating limits or ranges within which functions performed by the access node 800 may be performed, without reference to the gateway 802. When the functions move outside the ranges set, control of those functions may be passed to the gateway 802.

Further, the access node 800 and the gateway 802 may cooperate to advantageously optimise content delivery to a mobile terminal.

Figure 8:
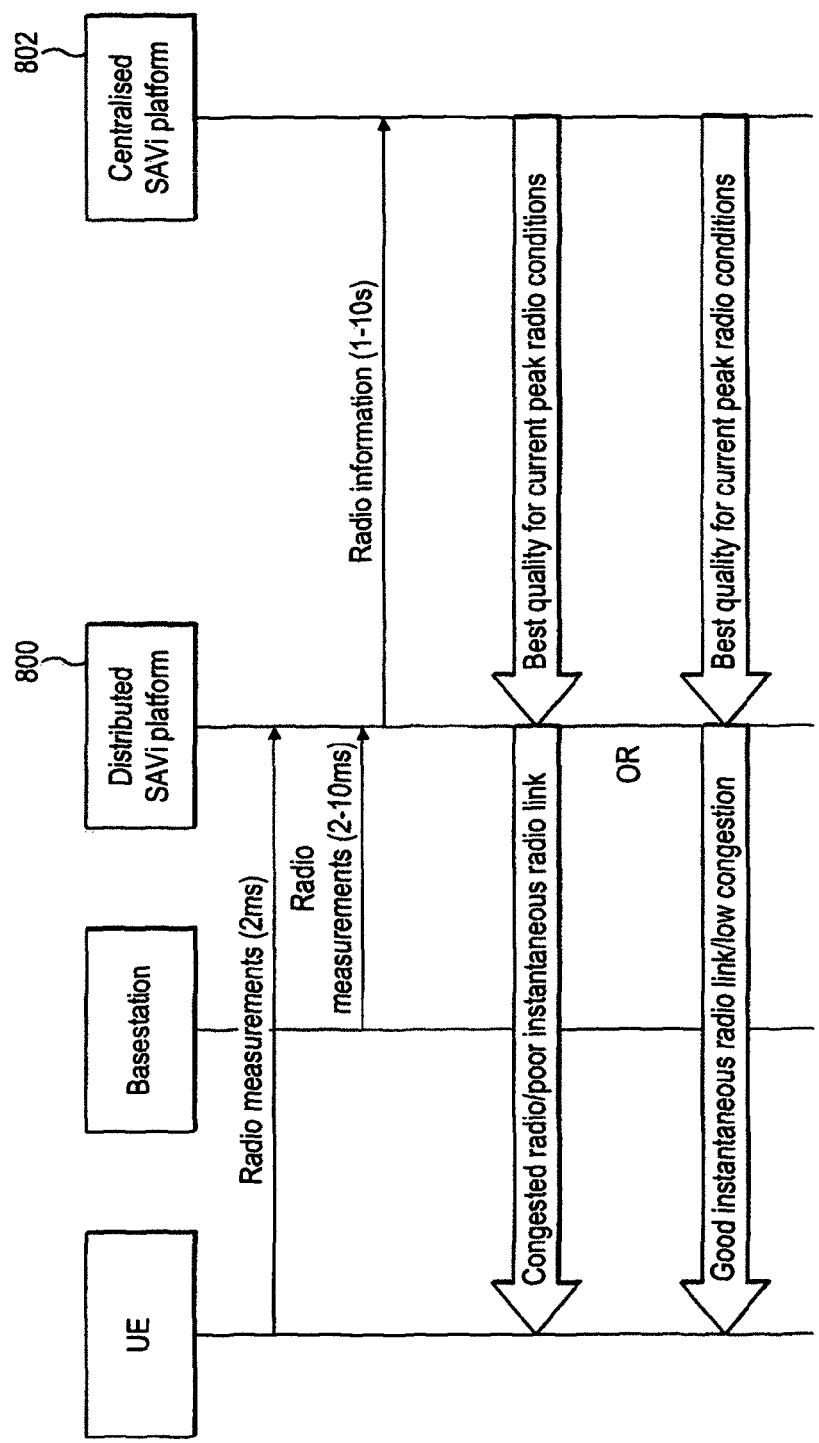
FIG. 8 shows the optimisation of content delivery to a mobile terminal according to an embodiment of the system described herein.

The optimisation of content delivery will now be described with reference to FIG. 8 of the drawings. Content may be optimised at gateway 802 and at an access node 800. The gateway 802 may serve multiple access nodes 800, and my distribute content to those multiple access nodes 800, for onward transmissions from each of those access nodes 800 to a mobile terminal via the radio frequency part of NodeB, the Femto or the AP serving that node. Radio quality measurements are reported by the mobile terminal to the access node 800 at regular intervals, such as 2 millisecond intervals. Radio quality measurement relating to that mobile terminal are transmitted between the radio frequency part of the NodeB, the Femto or the AP serving the mobile terminal to the access node 800 at regular intervals, such as between 2 and 10 millisecond intervals. These radio measurements are received at the soft nodes 702 and are passed to functions 704 (e.g. to QoS function 732 for analysis). These radio frequency measurements from the mobile terminal and the NodeB are reported by the access node 800 to the gateway 802 (e.g. to QoS function 732 of the gateway 802 for analysis) at regular intervals, such as intervals of between 1 and 10 seconds. The gateway 802 may receive radio information from multiple access nodes 800. The radio measurements received by the gateway 802 may be analysed over a relatively long period, such as between 1 and 2 minutes. The radio quality measurements may be averaged (for example, the arithmetical mean of the radio quality maybe determined) over this time period. The transmission of content from the gateway 802 may then be optimised according to this calculation. Where the content is distributed by the gateway 802 to a plurality of access nodes 800, the content distribution will be based on the analysis of the radio quality indicators from all of the access nodes 800. The analysis may consider the maximum or peak radio performance over the time period of between 1 and 2 minutes.

When the content is received by each access node 800, the access node 800 then distributes the content to each mobile terminal. This distribution is optimised based on real-time network mode and mobile terminal specific radio link quality, as determined over a period of, for example, between 1 and 10 milliseconds. That is, content delivered to a mobile terminal that has high radio link quality may be optimised in a different manner to a mobile terminal that had poor radio link quality.

Figure 9:
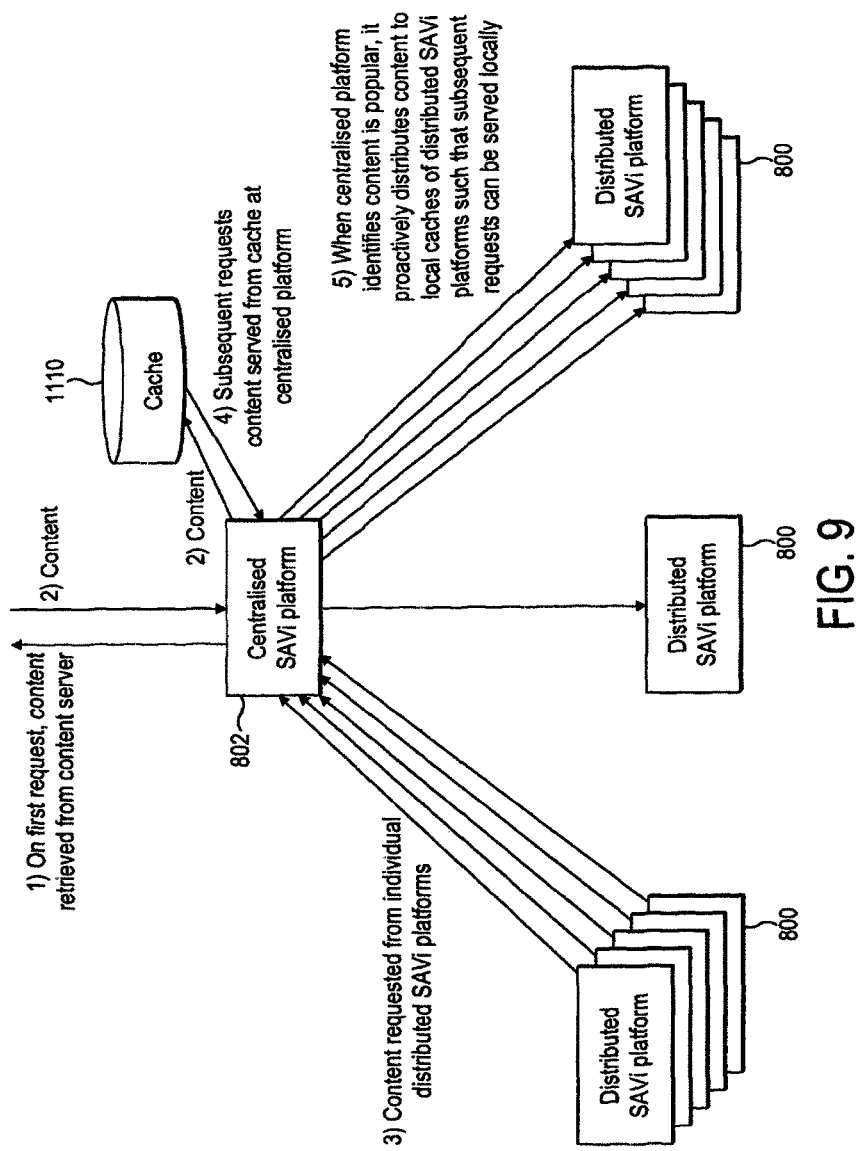
FIG. 9 shows a further optimisation of content delivery to a mobile terminal according to an embodiment of the system described herein.

The co-operation between access nodes 800 and gateways 802 may further enhance the distribution of content in a manner now to be described with reference to FIG. 9.

When a mobile terminal requests a particular content item, this request is transmitted to the access node 800 serving that mobile terminal, assuming that this is the first request for this content item to the access node 800, the access node 800 passes this request to the gateway 802 serving the access node 800. Assuming that this is the first request for this content item from the gateway 802, the gateway 802 retrieves the content from a content server. The content is then provided by the content server to the gateway 802, and from there is distributed to the access node 800, and onwardly to the requesting mobile terminal. Advantageously, the gateway 802 maintains a record of content items that are requested frequently. When a content item is determined by the gateway 802 to be requested frequently, this is stored in a cache 1110 associated with the gateway 802 (which may be the cache 728 of the platform 700). Subsequent requests for that content item from access nodes 800 to the gateway 802 can then be serviced by retrieving the content item from the cache 1110 and distributing the content item to the requesting access node 800, and thus avoiding the need to request the content from the content server.

The gateway 802 may be further configured to identify popular content items that are likely to be requested by a large number of access nodes 800. When it is determined that a content item is popular, the gateway 802 may push these content items to each of the access nodes 800 associated therewith (so that this content is hosted at the access node 800, using Content Delivery Network (CDN) function 730 of the network functions 704 of the gateway 802 and the access node 800). The content is then available at the access node 800 for transmission to any mobile terminal that requests it, without having to retrieve this content from the gateway 802 or the content server. Advantageously, the distribution of such content items is performed in a manner which takes into account the capacity or the congestion of the link between the mobile terminal and the gateway 802 and the nature of the content. For example, typically a link between a mobile terminal and the gateway 802 may experience very little usage and congestion in the early hours of the morning. The content item can be advantageously transmitted in between the gateway 802 and the access node 800 at this time, when there is spare capacity. The gateway 802 will determine whether the content item is suitable for transmission on this basis, for example, by taking into account a number of times that the content item has been requested, the size of the content item and the storage space at the access node 800. If a content item is relatively small and is time-critical, such as news headlines, then such a content item may be distributed frequently throughout the day, as such content is not suitable for transmission once a day at early hours of the morning, as it becomes quickly out of date.

Relocation of Mobile Terminal

Figure 10:
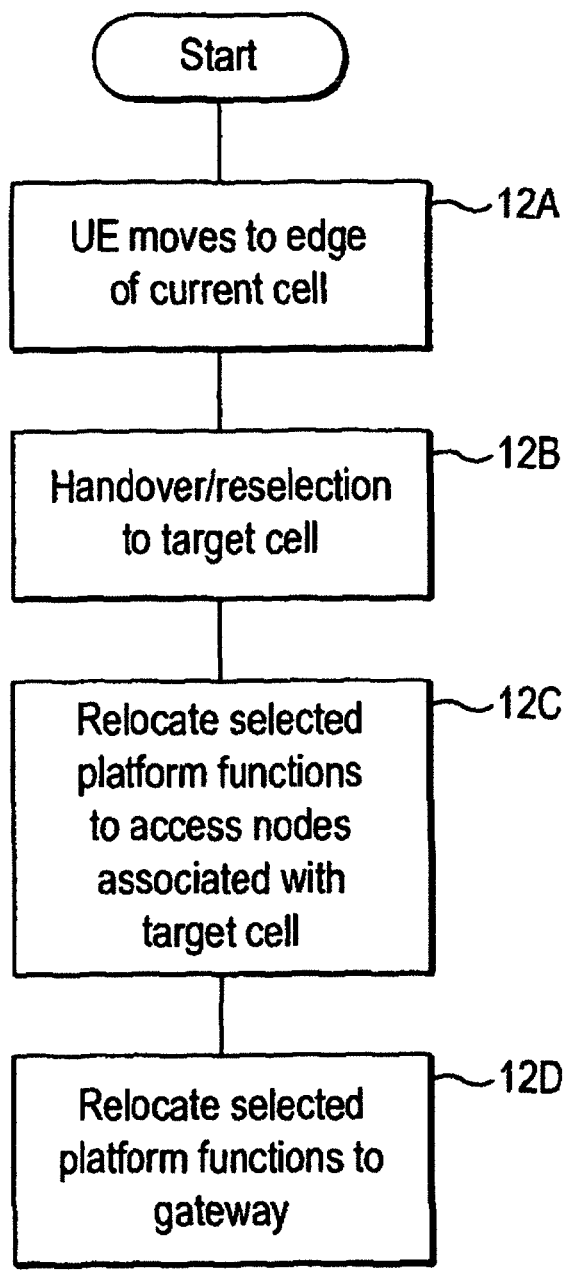
FIG. 10 is a flow chart showing the procedures performed when a mobile terminal moves within the network according to an embodiment of the system described herein.

The procedures performed when a mobile terminal moves between cells in the mobile telecommunications network will now be described with reference to FIG. 10. In the conventional manner at step 12A, when the mobile terminal moves to the edge of its current serving cell, the radio measurements reported from the mobile terminal and the radio frequency part of the NodeB, the Femto or the AP serving that mobile terminal are used by the core network to determine when to perform a handover and to which target cell the handover should be performed. When the best target cell has been identified, handover to that target cell from the serving cell it is performed at 12B in a conventional manner.

At step 12C selected platform functions may be relocated from the source access node (that served the old cell) to the destination access node (that serves the new target cell).

When the source and destination access nodes are served by the same gateway, only base station function (such as soft NodeB functions 708) may be relocated to the destination access node.

The relocation of functions of the access nodes is performed independently to the radio handover, so for some time after the radio handover, the source access node continues to serve content to the mobile terminal through the destination access node. The routing of data packets for the 3G network between the destination and the source access nodes may be performed using an Iu interface between the RNC or BRAS function 712 of the destination access node and the SGSN/GGSN function 714 of the source access node. Alternatively, the routing of data packets between the destination and the source access nodes can be completed by the SGSN/GGSN function 714 of the destination access node connecting directly to functions of the source access node through an IP interface.

After handover has been completed at step 12B, the access node controlling the mobile terminal may be relocated from the source access node to the destination access node in coordination with the gateway. the standardised handover decisions (mainly based on coverage, quality, power, interference, etc.) for 2G, 3G, LTE & fixed network are used to move the mobile from one node or system to another. However, the platform 700 introduces new opportunity to make the handover decision based on type or characteristics of the certain application, type of user and the QoS requirements.

The timing of the relocation of access node functions from the source to destination platform may be dependent on the following:
 the duration of the current connection/communication of the mobile terminal
 the speed of movement of the mobile terminal
 the characteristics of the applications being used by the mobile device, the quality of service, the predicated type and amounts of transmission ongoing.
 The radio resource allocations status at the mobile terminal
 The respective node of the source and destination and access nodes.

At step 12D, optionally, some functions will be reallocated from the access nodes to the gateway. For example, if the destination access node is heavily loaded and is congested, or has a lower capability then the source access node, or the mobile terminal is determined to be very mobile, it may be advantageous to transfer functions to the gateway. Functions are reallocated from the access node to the gateway by, for example, a Serving Radio Network Subsystem (SRNS) relocation between the RNC function 712 of the access node and the gateway. Alternatively the functions may be reallocated by performing a radio reconfiguration of user connection to the mobile terminal.

The reallocation of functions from an access node to the gateway may be performed at call/communication sessions set-up. At call/communication session set-up, further subscriber information will be provided, which may be used by the access node or gateway to be determine whether it would be advantageous to reallocate functions from the access node to the gateway. Reallocation of functions from the access node 800 to the gateway 802 may be performed during an active connection when a requirement of the communication sessions has been modified, or where the required resource is not available at the access node 800.

According to the same principles, applications may be (re)located (or distributed) between access nodes 800 and for gateways 802 to provide optimised application delivery/best use of the communication resources.

As mentioned above, information about each application used by the user at the mobile terminal is stored in an application context. The application context is shared between each access node 800 and gateway 802 that control the user connection for that mobile terminal. One of the access nodes 800/gateways 802 will be the "master" for that particular application, and that will also be the master of an application specific record in the application context. The application context is advantageously periodically synchronised between the access node 800 and the gateway 802.

The application information is the application context specific to a particular mobile terminal, and this is passed between access nodes and gateways during reallocation for a mobile terminal, enabling the application to be seamlessly passed access nodes/gateways, avoiding impacts to the user experience.

Figure 11:
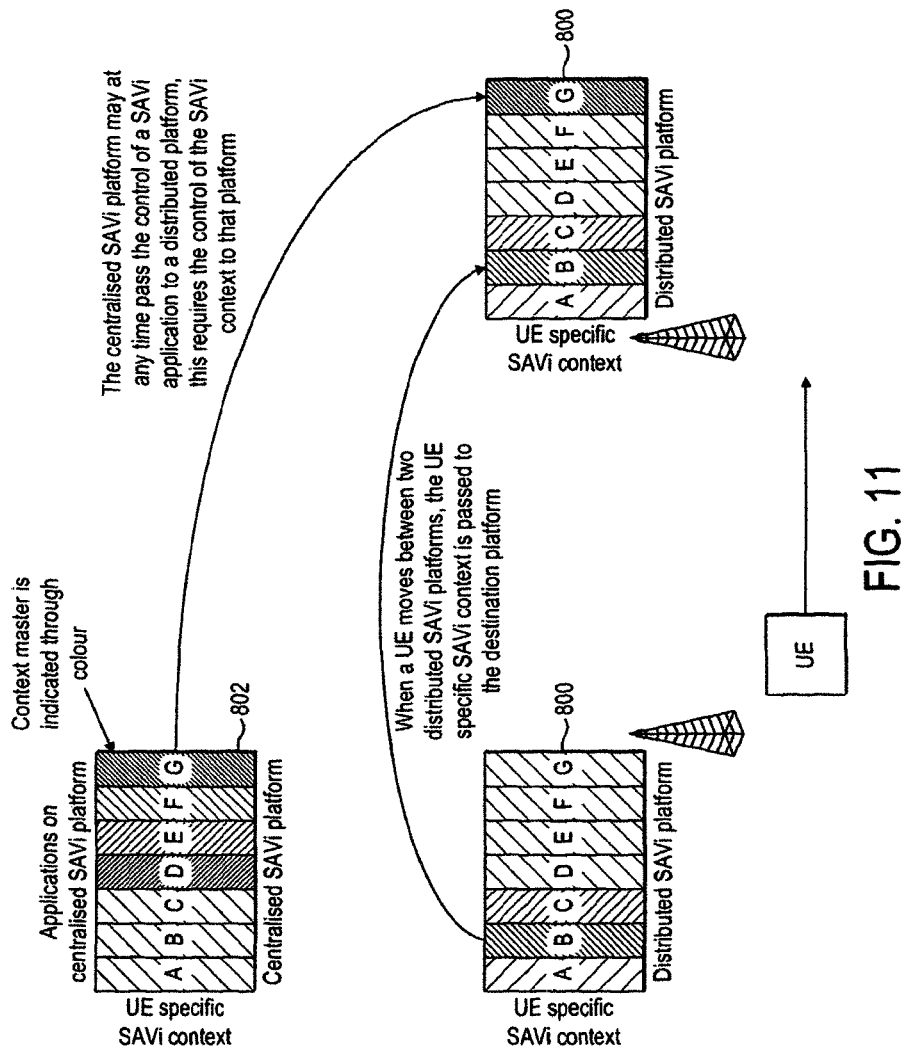
FIG. 11 shows the transfer of information between platforms according to an embodiment of the system described herein.

FIG. 11 shows the transfer of application information between access nodes and gateways.

Tailoring Bandwidth to Application

Radio measurements received from the radio frequency part of the NodeB, the Femto or the AP serving the mobile terminal are passed to the soft nodes 702 of the platform 700 (of the access node 800 or gateway 802 serving the mobile terminal), and are passed to the network functions 704 of the platform 700, which then distributes the measurements to where necessary within the platform 700. The platform 700 has access to the subscriber information from the core network, which allows the network functions 704 to deliver data traffic in a manner that is optimised for radio conditions as indicated by the radio measurements. The data traffic may also be optimised according to the subscription of the user of the mobile terminal available radio resource, mobile terminal capability, and/or for the class of the terminal (e.g. access technologies used). This optimisation allows bandwidth usage to be balanced with customer experience. The subscriber information may include information about the price plan of the user of the mobile terminal. The mobile network operator may track the type of application used by the user, the total data usage of the user, and may differentially target radio resources the highest data value stream of users.

By hosting applications 740, 742 in the services part 706 of the platform the access node 800 (or at least the gateway 802), the point of the network that is aware of the application being used by the user of the mobile terminal closer in the link between the mobile terminal and the core network to the NodeB serving the mobile terminal. This enables the sharing of network resources to the most appropriate data streams, such as the most profitable data streams. Such awareness of the application to which a request for data transmission relates allows the use low value data streams, such as peer-to-peer file sharing, to be allocated only limited bandwidth, so that remaining bandwidth can be targeted to particular users. In the uplink, transmission of data can be controlled by the access node 800 (or gateway 802) hosting the application to control data flow appropriately before data is onwardly transmitted towards the core of the network (which was not possible with conventional arrangements).

Application Programming Interface (API)

As mentioned above, a novel API is provided which defines the language that each of the software modules 740, 742 of the platform 700 use to communicate to coordinate to optimise application delivery to users. The platform 700 negotiates which each application 740, 742 the specific resource and performance requirements based on the application characteristics, allowing the application to directly communicate the scheduling performance requirements, rather than using a predefined set of quality of service parameters. This negotiation between the platform 700 and the applications 740, 742 is facilitated by the API.

The API may also facilitate the provision of radio link quality information (e.g. from QoS function 732) to applications 740, 742.

The API may further enable the platform 700 to control use of the applications 740, 742—e.g. to allow, disallow or adapt the applications.

By way of example, the application 740 may be a Voice over IP (VoIP) application. The nature of Voice over IP communications is that there is a virtually continuous succession of small data packets in which voice data is communicated. The voice data must be communicated with no or minimal latency in order that a two-way conversation can be performed successfully. The Voice over IP application 740 is able to compress voice data before transmission using a variety of techniques/CODECs. The compression techniques/CODECs may range from a relatively low compression technique, which provides high quality voice reproduction but requires a large bandwidth, to a much higher compression technique which provides reduced voice quality and which requires a much lower bandwidth.

The API is operable to provide details of the application characteristics to the network functions part 704 of the platform 700. This makes the network functions part 704 of the platform aware of the characteristics of the application. In the present example, as the application is a Voice over IP application, the network functions part 704 may be made aware that the application will tend to transmit continuous successions of small data packets that require transmission with no or low latency. The network function 704 may then be configured appropriately.

The API may further be operable to allow the network functions part 704 to communicate radio link quality information to the application 740. For example, when the network functions part 704 received information regarding the application characteristics (via the API), it may allocate radio link resources to that application 740. This allocation of radio link resources may be communicated by the network functions part 704 to the application 740 (via the API). The application 740 may then select an appropriate compression technique/CODEC in dependence upon the radio link quality available. During a Voice over IP call, the available radio link quality may be communicated regularly from the network functions part 704 to the application 740 (via the API) to allow the application 740 to vary the compression technique/CODEC used in accordance with changes to the radio link quality.

The network functions part 704 may control how the applications 740, 742 work (via the API). The network functions part 704 may allow, disallow or adapt the applications 740, 742 hosted in the services part 706 of the platform 700. For example, the network functions part 704 may require the Voice over IP application 740 to use a particular compression technique/CODEC if radio link bandwidth is restricted.

Another example of how the network functions part 704 may advantageously provide radio link quality information to an application (via the API) is when the application 742 is a gaming application used by several users. If the radio link quality information received by the application 742 indicates that bandwidth is restricted, the application 742 may adapt is communications to the users such that latency of the communications is increased uniformly for all of the users (so that they all experience the same delay), in order that each of the users is provided with the same gaming experience.

In the embodiments described, the devices that connect to the platforms 700 are mobile devices that connect to the platforms via the radio access network of a mobile/cellular telecommunications network. It should be appreciated that non-mobile (fixed) devices may be connected to the platforms 700, for example by a wired or cable connection.

Allocation of Services

The controller is responsible for allocating the service instance for each UE, based on the UE locations and the controller capacity, capability and available resources to host another instance of a service.

For certain low popularity services or where the available serving controller capacity or capability is limited, the service can be hosted from a central controller, or from a neighbouring distributed controller.

For some services/functions, where the source and destination client applications are in the same geographical region, being served by the same site (e.g. BTS location) or site cluster (e.g. finite number of sites), the access node 800/gateway 802 ensures that the server for the service is located close to both users, and the traffic is routed between the users within the site.

Smart Client

The cost to carry data between a particular mobile device and a particular cell depends on many factors. This "cost to carry" data is an indicator of the value of total resources required to convey the data. For example, it will usually cost more to convey data via a 2.5GPRS base station than via a WiFi access point because data transmission via a 2.5G base station is slow and relatively inefficient and must be transmitted via a complex and therefore expensive backhaul network to the core network and then for onward reception/transmission. This is true, although to a lesser extent, even when a platform 700 is provided which allows data traffic to bypass the core network in a manner described above. In contrast, WiFi access points operate over a much shorter range and with a higher data capacity whilst also having a much simpler and therefore less expensive backhaul by which data can be offloaded directly to the internet from the access point via an appropriate direct link (such as an xDSL network).

Further, macro or femto base stations and mobile devices that operate in accordance with cellular telecommunications Standards/transport protocols vary the power of radio transmissions in dependence upon the characteristics of the link between the base station and the device. For example, power is increased if the distance between the base station and the device is greater, or if the radio conditions are poor (which may be caused by environmental factors or by obstacles, such as buildings) between the base station and the device. Such an increase in power increases interference, and therefore reduces the overall capacity of the base station to convey data between itself and other devices. From the above discussion, it should be appreciated that the "cost to carry" data between a device and a WiFi access point is relatively low. The "cost to carry" data between a base station operating in accordance with mobile telecommunications Standard and a device located close to the base station, and without obstructions, is higher, whereas the cost to transmit data between such a base station and a device at the edge of the coverage area of the cell is higher still.

The "cost to carry" data between a device and a 3G (UMTS) or a 4G (LTE) base station is generally lower than the 2.5G base station because base stations operate in accordance with more modern Standard and make more efficient use of the available radio spectrum. Even within a single cell at a single moment in time, the cost of carry data may vary dramatically depending upon the radio conditions and locations of different devices associated with that base station.

The overall load on a mobile telecommunications network varies dramatically by geography and by time. Generally, a small percentage of cells of the network may be fully loaded, whilst many of the other cells have a low load. The "cost to carry" data in geographical areas and at times when cells are fully loaded is high, because it drives technology upgrades—that is, new infrastructure, such as new base stations, are introduced to cope with the traffic. In contrast the "cost to carry" data in geographical locations, and at times where network traffic is low, is low. Network operators design their network architecture with sufficient capacity to be able to meet the demands of its customers on the busiest cells at the busiest times. This capacity is very expensive in terms of base stations and power. This expensive architecture, although used intensively for a particular busy time of the day, may be underused for large, non busy portions of the day.

Conventionally, a mobile telecommunications network has no control over when or where data is transmitted between a mobile device and base station or other access point, and will simply enable transmission of the data on demand.

The present embodiment seeks to overcome some of the problems associated with conventional mobile telecommunications networks. The embodiments seeks to allow mobile device users to send and receive data at times that are appropriate for the user whilst managing and making best use of the radio capacity across a telecommunications network.

An embodiment that manages the delivery of data to users will now be described with reference to FIGS. 12 to 17B of the drawings.

Figure 12:
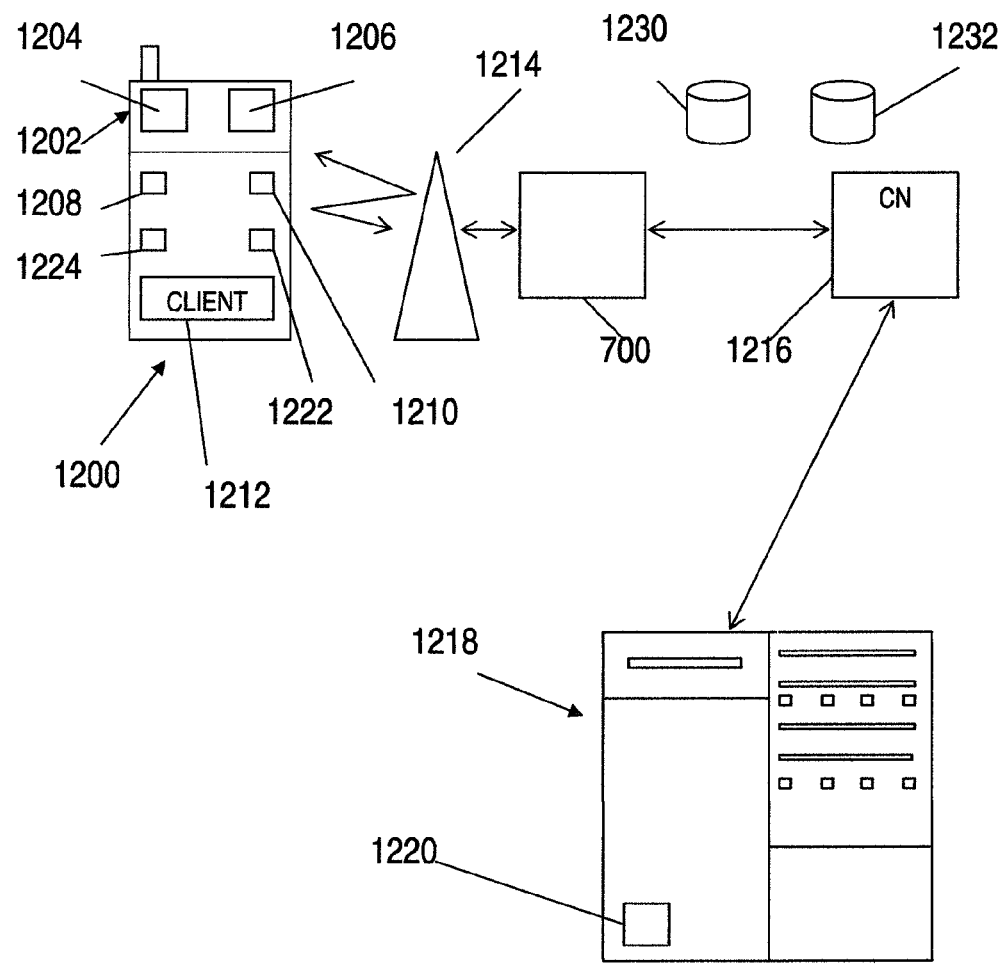
FIG. 12 shows schematically the elements according to an embodiment of the system described herein, including a mobile device having an access control client and a data managing server.

Referring initially to FIG. 12, the mobile device 1200 includes a service part 1202 (application layer) which hosts application 1204 and 1206. A cache 1208 and 1210 is associated with each of the applications 1204 and 1206, respectively. The applications may require the periodic reception and transmission of data. Such data requests are sent to a client 1212.

The client 1212 controls access between the applications 1204, 1206 and the radio access network of a telecommunications network, of which one base station 1214 is shown. Here, the term "base station" should be interpreted in its broader sense. The base station may be a cellular communications base station, such as a 2G, 2.5G, 3G or 4G "macro" base station. Alternatively, the base station may be a femto cell or may be an access point of a WiFi or other type of radio access network.

The network further comprises a network core 1216. The network may be provided with platforms 700 of the type described above, and a platform 700 may be associated with the base station 1214, for example to form an access node 800 (see FIG. 6). A data managing server 1218 is linked to the core network 1216 and includes a respective memory for each user's mobile device (such as device 1200) associated with the network. The memory for the mobile device 1200 is designated 1220.

Figure 13:
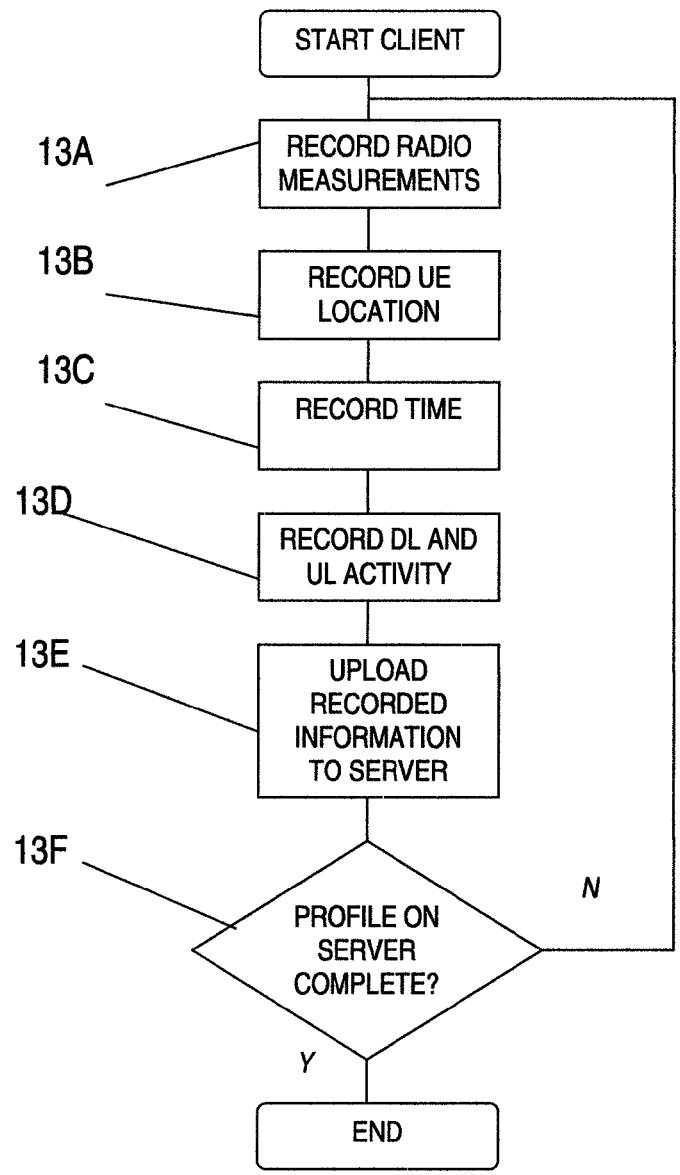
FIG. 13 is a flow chart showing the steps performed in a data collection operation performed by the client on the mobile device of FIG. 12.

Data collection operations performed by the client 1212 on the mobile device 1200 will now be described with reference to the flow chart of FIG. 13.

As described above, the mobile terminal 1200 measures the radio signals of the cell on which it is registered and the neighbouring cells when in both the idle and active state. These measurements are conventionally used for determining when to perform handover or cell reselection. According to this embodiment of the system described herein, at step 13A, the client 1212 is operable to record the signal measurements data from the current cell and neighbouring cells in a radio measurement store 1222 on the device 1200. Radio measurement may be recorded at predetermined time intervals, such as every five minutes, or over any other suitable time interval. The average (arithmetical mean) of the radio signal measurement of each cell may be calculated over the time interval and stored, or instantaneous values may be used. The recorded data may include radio access technology of each of the cells, for example whether they operate using 2G, 3G, 4G, Wi-Fi, a femto cell or other communication technologies, and the radio conditions of the cells. The identity of the cells is also recorded (for example their cell ID or SSID).

The location of the device 1200 at which the measurements are made is also stored in the radio store 1222 at step 13B. The location may be determined by GPS, cell triangulation or any other method. Also stored is the time the measurement was made, at step 13C. Further, any data communications between the mobile terminal 1200 and the base station 1214 are recorded at step 13D. The rate of data usage is measured and recorded. This applies to both downlink and uplink data communication activity. The device experiences in the cell may also be recorded—e.g. whether the connection is unreliable. The data are stored in a radio data store 1222 of the mobile device 1200.

At step 13E the data from the radio data store 1222 is uploaded by the client 1212, via the base station 1214 and core network 1216, to the store 1220 of the server 1218.

At step 13F it is determined whether the profile for the user of mobile of terminal 1200 (with which the store 1220 on the server 1218 is associated) is complete. If the profile is complete, then the procedure of FIG. 13 may be terminated for a predetermined time period; however, the procedure may be reactivated periodically in order to update the profile.

On the other hand, if it is determined at step 13F that the profile of the store 1220 of the server 1218 is incomplete then the procedure returns to step 13A and radio data continues to be recorded by the client 1212 and uploaded to the server 1218.

Advantageously, the client 1212 records radio measurement data when the mobile terminal is in the idle communication state as well as in the active communication state. In a conventional arrangement, radio measurements made when the mobile terminal is in the idle communication stage are never reported from the mobile terminal to elsewhere in the network, so this information cannot be used elsewhere.

Although step 13E (and step 13F) are shown as immediately succeeding the data collection and recording steps 13A, 13B, 13C and 13D, in the flowchart, it may be advantageous to accumulate recorded radio data over a plurality of the predetermined time intervals, and to subsequently upload the radio measurement data for a plurality of the predetermined time intervals in one data communication session. For example, the radio measurement data may be uploaded every hour or at any other regular time period. Alternatively, the radio data may be uploaded when the client 1212 detects that the radio conditions are optimal, so that the data may be uploaded in the most efficient manner.

Figure 14:
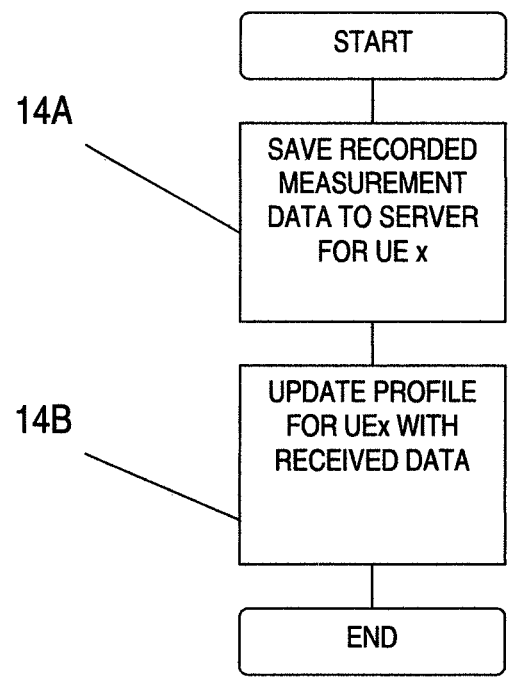
FIG. 14 is a flow chart showing the steps taken in the process for receiving radio data at the server of FIG. 12.

FIG. 14 shows the steps performed in the process for receiving radio data measurement at the server 1218, which correspond to step 13E above.

At step 14A the server 1218 receives from the core network 1216 radio measurement data from the client 1212 of the mobile terminal 1200.

At step 14B the server 1218 updates the profile for the mobile terminal 1200 in the store 1220 on the server 1218 with the received information from the core network 1216.

The server 1218 uses the information provided by the client 1212 of the mobile terminal 1200 to identify trends throughout a particular time period, such as one day, of device movement, performance and cells which could provide data connectivity to the device 1200. Often over a predetermined time period, such as a day, a user follows the same movement pattern (that is, the user visits the same locations at the same or a similar time each day). This is referred to as a user "movement cycle". For example, many mobile terminal users will travel the same route at the same time to the same work location every weekday, and may pursue leisure activities at the same location and same time at weekends. The data recorded and reported by the client 1212 of the mobile device 1200 may be used by the server 1218 to identify likely opportunities during the day for advantageously performing data communication with the device 1200—typically, when the device is likely to be in a cell which has significant spare radio capacity and therefore low "cost to carry".

Figure 15:
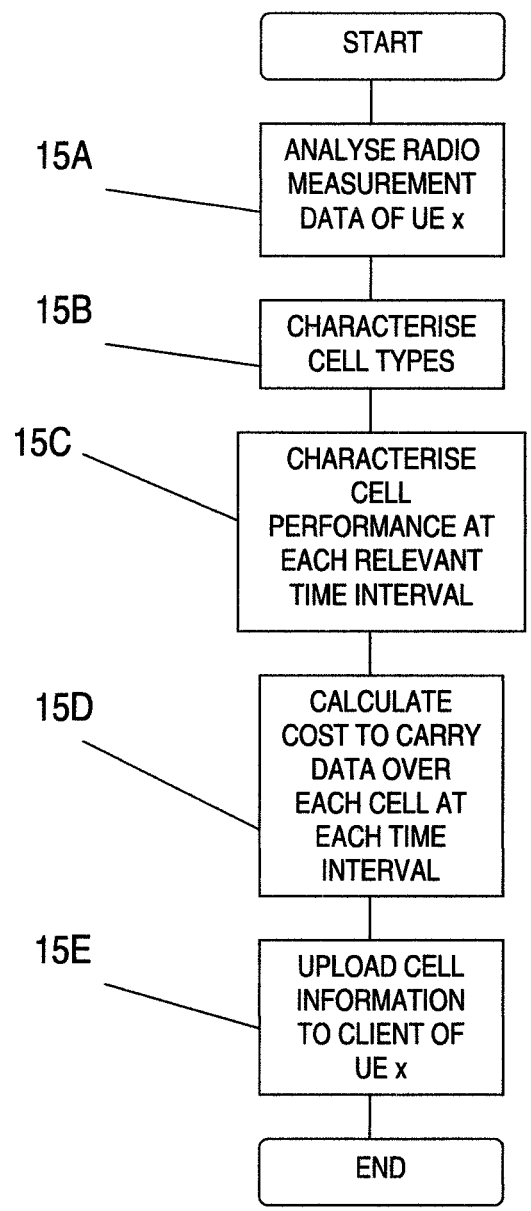
FIG. 15 is a flow chart showing the steps performed in a process for analysing data at the server of FIG. 12.

The analysis steps performed by the server 1218 will now be described with reference to the flow chart of FIG. 15.

At step 15A the server 1218 analyses radio measurement data stored in the store 1220 for the user of the mobile terminal 1200.

At step 15B the types of cell visited are identified, such as 2G, 3G, 4G, open femto, closed femto, dedicated office coverage systems, private Wi-Fi, public Wi-Fi etc. As will be appreciated, at a particular location and time a plurality of different cells may be available to provide radio coverage to a mobile terminal. Each of these cells is characterised in step 15B.

At step 15C the performance of each cell at a relevant time (for example, at each five minute time interval over a 24 hour period in which the device 1200 occupies the cell) is calculated. The spare data capacity of each cell at the relevant time is determined from the measurements provided by the client 1212, and also data from platforms 700 and the network core 1216. The spare data capacity will depend upon the demands of other users for data communication with the cell at the same time, the environmental conditions, the distance between the mobile terminal and the cell base station etc.

At step 15D the server 1218 calculates the "cost to carry" data over each cell at each relevant time interval throughout the measurement period. The "cost to carry" is generally inversely proportioned to the spare data capacity of a cell. It may also be dependent upon the number of carriers/quantity of spectrum allocated, the backhaul capacity/load, the backhaul type, the average QoE/QoS of the cell, output power of the base station and the interference environment. The "cost to carry" will also depend upon the type of cell, generally being longer for macro cells than for femto cells or WiFi.

At step 15E the server 1218 uploads the cell "cost to carry" data to the mobile terminal 1200 where it is received by the client 1212 and stored on cell information store 1224.

After the client is provided with the "cost to carry" data, the client 1212 is then able to predict, at a particular time in a user a movement cycle, when the mobile terminal 1200 is at a point in the movement cycle, when the mobile terminal will be in radio coverage of a cell which has low cost to deliver data.

Figure 16A:
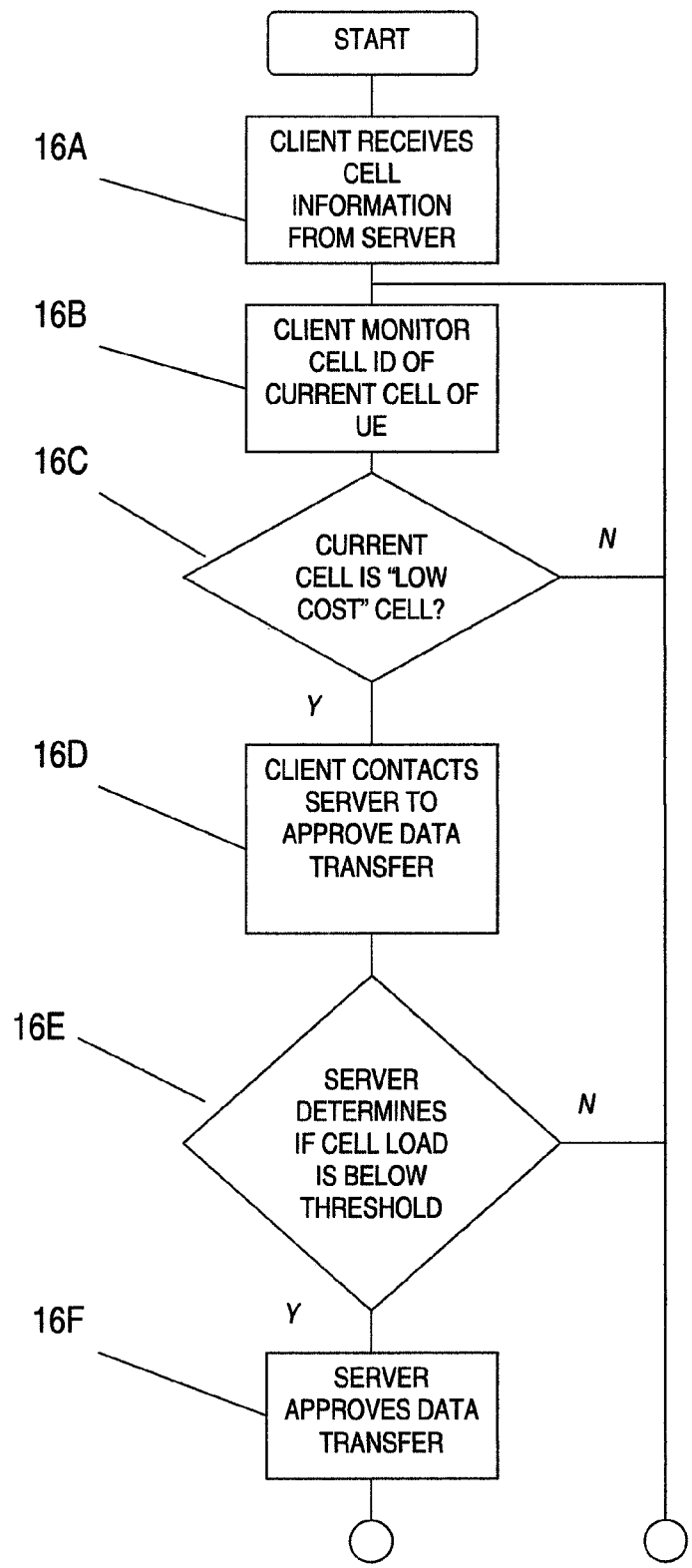
FIGS. 16A and 16B are a flow chart showing the steps performed in a process to determine whether a cell occupied by the mobile terminal of FIG. 12 is a cell with low "cost to carry" data.
Figure 16B:
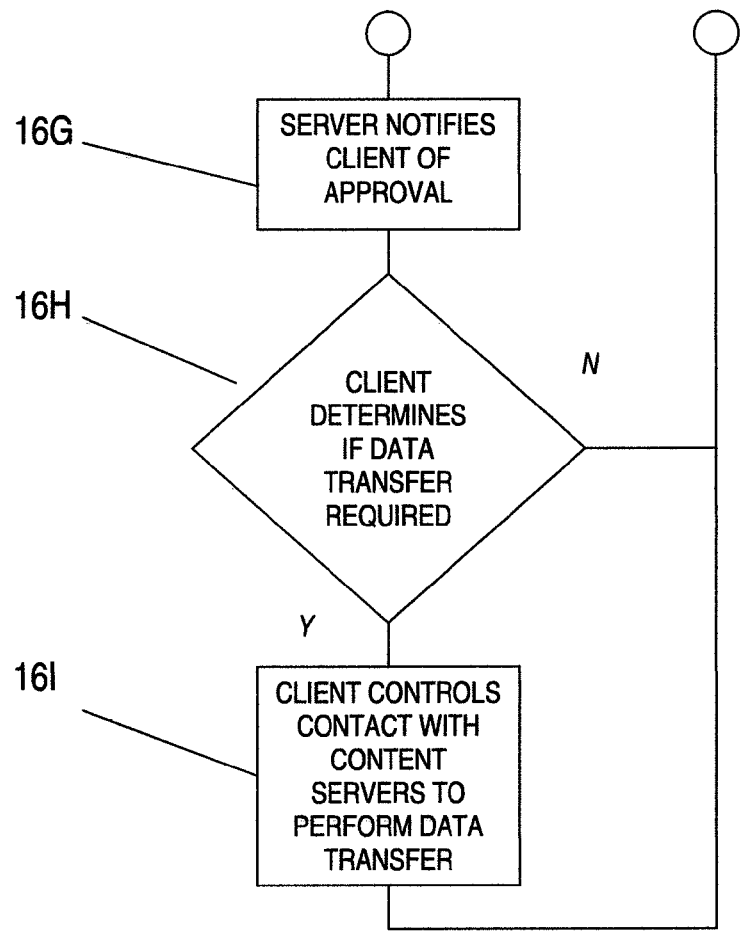

This process will now be described with reference to the flow chart of FIGS. 16A and 16B.

At step 16A the client 1212 of the mobile terminal 1200 receives cell information from the server 1218 and stores it in cell information store 1224.

At step 16B the client 1212 monitors the cell with which the mobile device 1200 is currently registered and also the neighbouring cells.

At step 16C the client 1212, for the relevant time/point in the user movement cycle, compares the current cell with "cost to carry" data in the store 1224 to determine whether the current cell is predicted to be "low cost" cell. This may be done by comparing the cell ID of the current cell with the cell's ID in the store 1224. If at step 16C it is determined that the current cell is not a "low cost" cell, then the procedure returns to step 16B. Optionally, if other cell IDs in the store 1224 for the relevant time period/point in the movement cycle are identified as "low cost" cells, the client 1212 may instruct the device 1200 to handover to that cell if in the active state or to select that cell if in the idle state. On the other hand, if it is predicted at step 16C that the current cell is a "low cost" cell, then at step 16D the client 1212 contacts the server 1218 (via the base station 1214 and core network 1216) to seek approval of data transfer.

At step 16E the server 1218 determines if the actual cell load of the "low cost" cell is below a predetermined threshold. As will be appreciated from the preceding discussion, the information stored in the store 1224 of the mobile terminal 1200 is used by the client 1212 to predict whether a particular cell may be a "low cost" cell at a particular time of day/point in the movement cycle. This is based on analysis of past measurements of cell load at that time/point, but may not reflect the true position at the cell at the current time. Conventionally, cell load information is not available to the core network 1216, and so could not be provided to the server 1218. However, because, according to the present embodiment, the platform 700 is provided, it is possible for the core network 1216 to obtain cell load information from the platform 700 (which, as described above, has access to real-time or regularly updated radio information from the radio frequency part of the base stations with which it is associated and may be reported by the QoS function 732—see FIG. 5) and to pass this to the server 1218 in order to determine the actual cell load at a particular time in step 16E.

The platform 700 is able to provide to the server 1218 information in relation to all 7 layers of the OSI model, i.e. the physical layer, data link layer, network layer, transport layer, session layer, presentation layer and application layer. The server 1218 is therefore able to accurately determine the real radio conditions.

In contrast conventionally, as mentioned above, real radio information is not available to the core network 1206 and so cannot be provided to the server 1218. In such a conventioned arrangement the radio capacity is estimated at the application layer of the OSI model using the Transmission Control Protocol (TCP). According to the TCP, the receiving device is required to respond with an acknowledgement message when it receives a data packet. The sending device records each packet that it sends, and waits for acknowledgement of receipt before sending the next packet. The sending device times from when each packet was sent, and retransmits a maximum packet if the time expires. The TCP uses a sliding window flow control arrangement for the purpose of sending data at a speed at which it can be safely transmitted and processed by the receiver. In each TCP segment, the receiver specifies in a "receive window" field the amount of additional received data that it is able to buffer for the connection. The sender sends only up to this amount of data before it waits for acknowledgement and window update from the receiver.

TCP is optimised for wired networks. Accordingly, any packet loss is considered to be the result of network congestion, and consequently the window size is reduced dramatically as a precaution by the receiver automatically when packet loss occurs. However, wireless links, such as those of solar telecommunications networks, experience sporadic and often temporary losses of data due to intercell handovers and other radio effects. These temporary losses are not due to congestion (which tends to be long term) but rather due to short term effects, such as radio effects. However, because TCP was designed for wired networks, it assumes that the data loss is due to congestion and significantly decreases the window size for the purpose of congestion avoidance. The window size is only increased again gradually. Whilst this is suitable for wired networks where, as mentioned above, congestion is relatively long term, it results in significant under utilisation of radio link capacity because any data loss is usually short term, the capacity if therefore wasted once the radio effects that resulted in data loss disappear whilst the TCP slowly increases the window size.

The present embodiment, by using actual radio measurements from the platform 700 avoids the disadvantages of TCP with wireless networks.

If at step 16E it is determined that the cell load is not below the predetermined threshold, then the procedure returns to step 16B.

On the other hand if at step 16E it is determined that the cell load is below the threshold, then at step 16F the server 1218 approves the data transfer.

At step 16G the server 1218 notifies the client 1212 of the mobile terminal 1200 of approval of the data transfer by sending a message via the core network 1216 and base station 1214. The actual cell load information and the radio access technology (2G, 2.5G, 3G, 4G, WiFi, etc) the cell may also be passed to the client 1212.

At step 16H the client 1212 determines if data transfer is actually required by any of the applications 1204 or 1206 of the mobile terminal. If no data transfer is required, then the procedure returns to step 16A.

On the other hand if it is determined at step 16H that one or more of the applications 1204 or 1206 requires data transfer then at step 16I the client 1212 controls contact with content servers 1230, 1232 to perform data transfer. The client may pass the actual cell load information and the radio access technology information to the servers 1230, 1232 so that they may optimise the data according to the conditions—e.g. to choose an appropriate compression scheme that is suitable for the bandwidth available.

Alternatively, or additionally, a procedure may be provided that determines whether data transfer should be performed on initiation of one of the applications 1204, 1206 of the mobile terminal 1200. This procedure will now be described with reference to the flow chart of FIG. 17.

At step 17A, the application 1204, for example, issues a request for data transfer. For example, the application 1204 may be a news provider application which displays to the user current news headlines. Upon selection of a headline by the user, a more detailed news storey is displayed, including relevant photographs. The application 1204 may be configured to periodically update the detailed news stories and to store these for display immediately that the user selects a particular headline. This updating of detailed news stories is done in the "background". The user does not initiate the updating and is generally not aware of it occurring. This allows the detailed news storey to be displayed without delay (avoiding data transmission delays) and also when the mobile terminal is out of radio coverage. However, this "background" downloading of detailed news stories may be regarded as "low priority" data because it is not obtained in direct response to a user request but rather is obtained simply in preparation for the eventuality that the user may wish to view the data.

In this example, the application 1204 issues a request to update the detailed news stories every 30 minutes. This will be in the form of a request for data transfer which is passed from the application 1204 to the client 1212 at step 17A.

At step 17B it is determined whether the requested data is already present in the cache 1208 associated with the application 1204. If it is determined that the data is in the cache 1208, then the procedure ends. On the other hand if it is determined at step 17B that the data is not in the cache 1208, then step 17C is performed.

At step 17C the client 1212 determines whether the request is a "low priority" request for data transfer. This may be determined may any suitable mechanism, such as a "low priority" data transfer request having a "low priority" flag associated therewith when it is issued by an application. If at step 17C it is determined that the transfer request is not a low priority request, then an appropriate data connection may be initiated immediately and the requested data may be transmitted in the conventional manner at step 17D. Such a higher priority request may be a direct request from a user via a web browser (application 1206) for train time information. Optionally, the client 1212 may be configured to prompt the user via the graphical user interface of the mobile terminal 1200 to approve this higher priority data transfer. Such a prompt may be given selectively. For example if the device 1220 is predicted to be in a "high cost" cell, then the prompt may be given, whereas if the device 1220 is predicted to be in a "low cost" cell, then the data connection may be initiated without the confirmatory prompt (the "high cost"/"low cost" determination is made using data in the store 1224).

On the other hand if at step 17C it is determined that the data transfer request is "low priority" (such as the background downloading of data like the detailed news stories for application 1204 described above) then at step 17E the client 1212 consults the store 1224 to determine whether the current cell is a "low cost" cell at the particular time the request is made. If it is determined at step 17E that the current cell is not a "low cost" cell, then the procedure returns to step 17A, and the background downloading is delayed.

On the other hand if at step 17E it is determined that the current cell is predicted to be a "low cost" cell than at step 17F the client 1212 contacts the server 1218 (via the base station 1214 and core network 1216) to approve the data transfer.

At step 17G the server 1218 determines if the actual cell load of the predicted "low cost" cell is below a predetermined threshold, in a similar manner to step 16E.

If at step 17G it is determined that the cell load is not below the predetermined threshold, then the procedure returns to step 17A, and the background downloading is delayed.

On the other hand if at step 17G it is determined that the cell load is below the threshold, then at step 17H the server 1218 approves the data transfer.

At step 17I the server 1218 notifies the client 1212 of the mobile terminal 1200 of approval of the data transfer by sending a message via the core network 1216 and base station 1214.

At step 17J the client 1212 controls contact with content servers 1230, 1232, which contain the detailed news stories, to perform data transfer to the cache 1208 so that the data is ready for use by the application 1204.

A further example of the type of application that can be included in the service part 1202 of the device 1200 is an email application. The email application may frequently poll an email server to obtain the text of any emails for the user of the device 1200. This polling may be performed at regular time intervals, such as every five minutes. This polling may be performed by a conventional data transfer performed immediately irrespective of the "cost to carry". Such polling requests may be transmitted via the client 1212 but without the "low priority" flag mentioned above, so that the request for data are handled immediately (e.g. at step 17C). The email application determines whether each email as an "attachment" (i.e. an associated data file such as a spreadsheet document or photograph). The email application sends requests to download these attachments to the client 1212 but with the "low priority" flag. In accordance with the procedure of the flow chart of FIG. 17, after the client 1212 has received the data transfer request (step 17A) and has determined that the required data is not stored in the cache associated with the email application (step 17B) it is determined at step 17C whether the data transfer request is "low priority" or not. As indicated above, if the transfer request does not include the "low priority" flag (in this example data request is for the text of the email), at step 17D immediate data transfer of the email text is performed. However, if the request for data transfer is an attachment, then it will include a "low priority" flag. This will be detected at step 17C.

For this "low priority" data the cell information store 1224 is consulted at step 17E to determine whether the current cell is predicted to be "low cost" cell. If the current is predicted to be a low cost cell then at step 17F the client 1212 contacts the server 1218 to seek approval for the data transfer. At step 17G the server determines if the actual cell load is below a threshold. Only if the actual cell load is below the threshold is the data transfer approved by the server at step 17H, and the client notified of this approval at step 17I. At step 17J the client 1212 controls contact with the server to perform the data transfer in the low cost cell. The attachments are therefore downloaded by the client 1212 when the device 1200 is in a "low cost" cell. This downloading of the attachments occurs in the background and the user of the mobile device 1200 is not aware of it. However, when the user attempts to open an attachment to an email that has been downloaded in the background, the attachment is available immediately. The usual experience is therefore enhanced but without using high cost network resources.

Figure 17A:
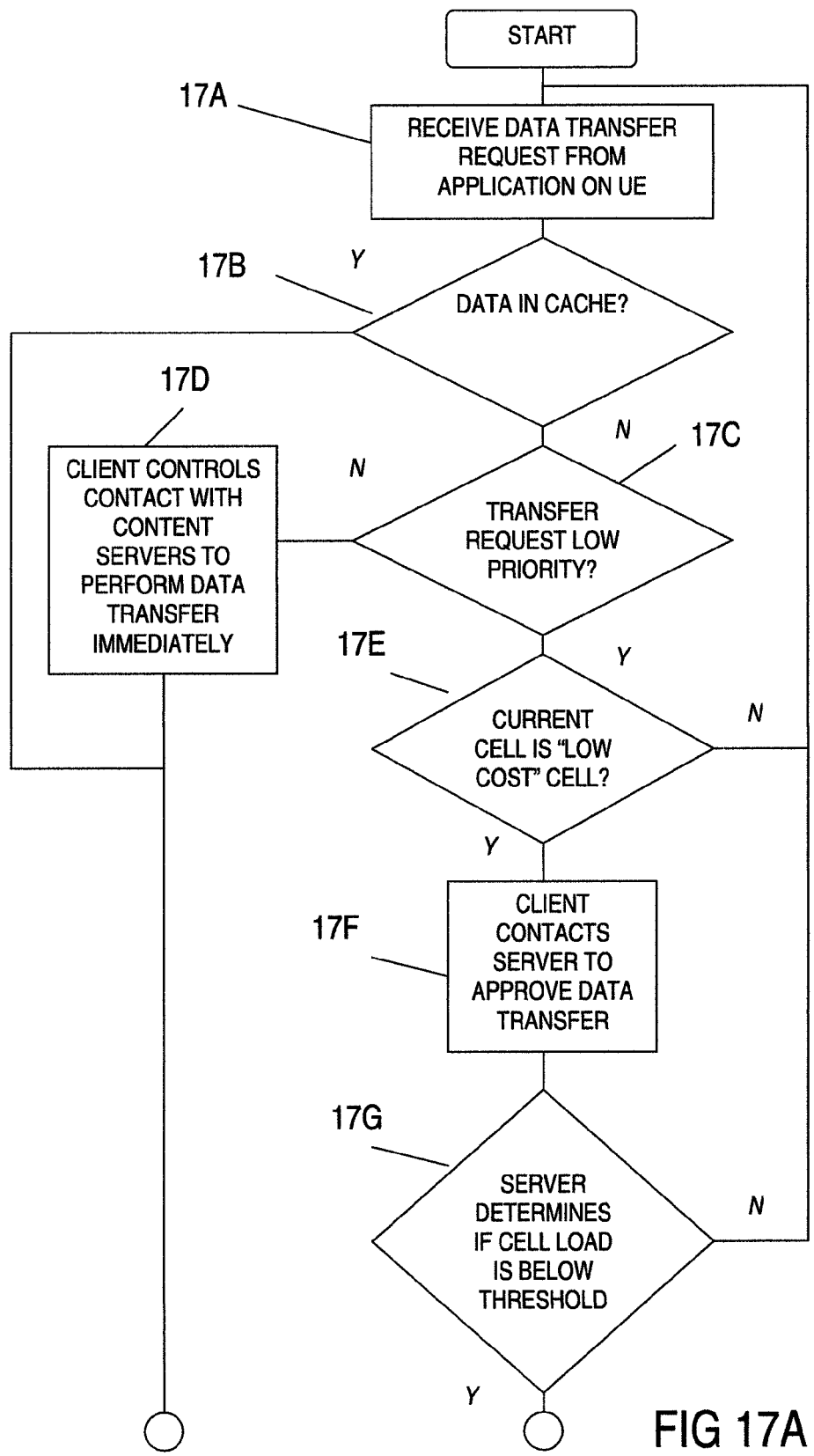
FIGS. 17A and 17B are a flow chart showing the steps performed in a process for determining whether data transfer should be performed on initiation of one of the applications of the mobile device of FIG. 12.
Figure 17B:
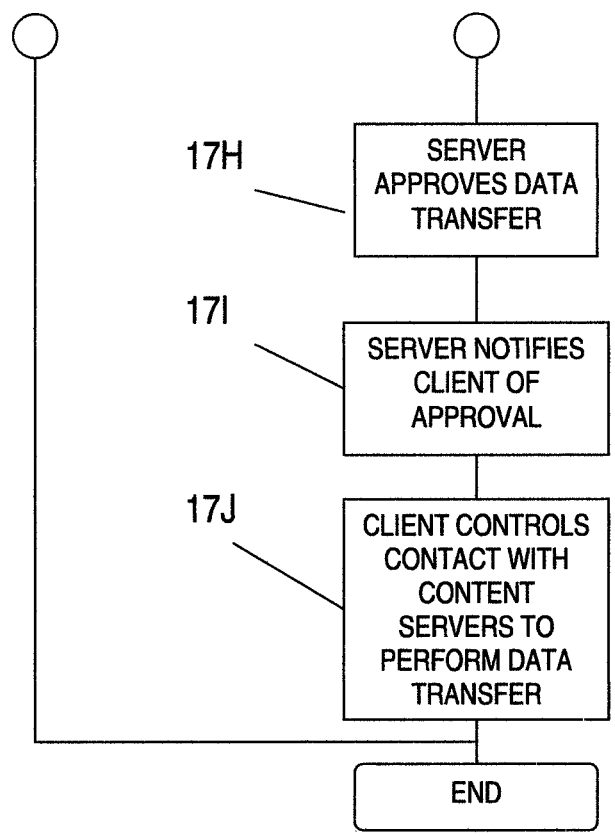

If an email text is obtained in the manner discussed above and with which there is an attachment associated it is possible that the user would wish to consume the attachment before it has been obtained by the background downloading process described above. In response to a request from the device user, the email application will issue a request to download the attachment to the client 1212 but without the "low cost" flag. In the procedure of FIG. 17, this will result in the attachment being downloaded immediately in step 17D.

In addition to calculating the "cost to carry" in step 15D, and sending this to the client 1212 in step 15E, the server 1218 may analyse the data usage measurement information recorded at step 13D to identify periodic requests for data transmission to/from the device 1200. This analysis resulted in the creation of a "rules and policy file" which may be sent from the server 1218 to the client 1212 of the device, and which instructs the client 1212 to download data at a particular point in the movement cycle or provide it to the caches 1208, 1210, and by also instructing the client 1212 to perform upload of data at a particular point in the movement cycle. For example, if the device 1200 requests download of an on-line newspaper at 7 am every morning this will be determined by the server 1218. The download of the newspaper will be a considerable amount of data. If this download is performed when not in a "low cost" cell, the cost to carry the data will be significant. Advantageously, the server 1218, on identifying such a download pattern, analyses the "cost to carry" data for cells that the device 1200 occupies in a period before the download is requested (i.e. in the period before 7 am). The server may identify that the device 1200 is usually located in a "low cost" cell between 2 am and 6.30 am (for example, while at home) on a regular basis but in higher cost cell between 6.30 am and 8.00 am (for example while commuting to work) on a regular basis. The server 1218 identifies that a low cost download is available from between 2.30 am and 6.30 am and that a request for a specific URL download is expected at 7 am. The server 1218 includes in the "rules and policy" for the client 1212 of the device 1200 an instruction that, if the device 1200 was located in a "low cost" cell between 2.30 am and 6.30 am, it should request download of data from the URL. The downloaded data is then stored in an appropriate cache for immediate retrieval by the appropriate newspaper application on request by the user.

The downloaded data according to the "rules and policy" file by the client 1212 may be subject to step of confirming with the server 1218 that the predicted low cost cell actually has a load below a threshold in the manner described above with reference to step 17G of the process of FIG. 17.

Data transmission request patterns my be observed by the server 1218 for a multiplicity of data types associated with different applications. The "rules and policy" file will include data for the data transmission types and applications. By operating in accordance with the "rules and policy" file provided by the server 1218, the client 1212 may perform background downloading of data to the relevant cache associated with each application. The applications are configured to consult the cache (in the manner described in step 17A and 17B of the flowchart of FIG. 17) before requesting a data transfer from the client 1212. If the requested application is stored in the cache associated with the application, the data is available for immediate use by the application, so the user experiences no delay and can access the data even when the device 1200 is not in coverage of any base station.

The user of the mobile device 1200 may be able to interact with the client 1212 using a user interface. This allows the user to set their preferences for data transmission. For example, the user may choose to prioritise the download of some content or files, and to add web pages or applications to the "rules and policy" file, so that these are automatically downloaded to be ready for consumption at a particular time.

A differential charging structure may be applied to data downloaded in the background in accordance with this embodiment. For example, the user may not be charged for such background downloading of data but may only be charged when the data is actually consumed. The caches described above (included caches 1204 and 1206) may be securely associated with the client 1212 such that data in the caches cannot be accessed by the applications (including applications 1204 and 1206) without the approval and knowledge of the client 1212. The client 1212 then records the amount of data that is actually consumed by the applications. This consumption data is provided to the network core 1216 so that the billing records held centrally within the network can be updated to reflect the data consumed, rather than the data transmitted.

Optionally, security of this process may be improved by received data being sent in encrypted form and stored in the caches 1208, 1210 in encrypted form. In order for the client 1212 to allow consumption of the data, the client must request a key to unlock the content. The request for a key is sent by the client 1212 to the core network 1216. When the core network 1216 issues the key to the client 1212 for consumption of the encrypted data, the billing record is updated so an appropriate charge can be made. Such an arrangement provides that it is difficult or impossible to bypass the notification of the core network 1216 if it is desired to consume the downloaded data.

Other examples of applications in the service part 1202 of the device 1200 include a software update application which may, for example, periodically check with a remote server for updates to the device operating system. If it is determined that an update to the operating system is required, then the application issues a request to the client in the manner described in relation to step 16A of the flowchart of FIG. 16. The subsequent steps of flowchart of FIG. 16 are then performed. As the updated operating system is generally a low priority, such a request is typically given a "low priority" flag by the application (although it may not have such a flag if it is an urgent update). According to the process of FIG. 16, the software update will only be downloaded when the device is predicted to be in a "low cost" cell, and when the server 1218 determines that the actual cell load is below the predetermined threshold.

Another example of an application in the service part 1202 of the device 1200 is a backup application. For example, such a backup application may backup the contacts and photographs stored on the device 1200. Such backing up of data is a low priority activity, and therefore request to backup data sent by the backup application to the client 1212 include the "low priority" flag. This is sent in step 16A of the process of FIG. 16. The other steps of the process of FIG. 16A are followed so that the data to be backed up is transmitted (uploaded) to a remote backup store only when it is predicted that the device 1200 is in a low cost cell, and when the server determines that the cell load is actually below the predetermined threshold.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

The headings used in this description shall have no effect on the meaning or interpretation of the description.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A mobile telecommunications network, comprising:
a plurality of terminals;
a core;
a radio access network having a radio device for providing wireless communication resources to the terminals; and
a processing device that records information indicative of a movement cycle of one of the terminals through the radio access network and that identifies points within the movement cycle at which there are spare communication resources to provide a list of spare resource points to the terminal to enable the prediction of optimal data transfer points during a subsequent movement cycle of the terminal through the radio access network.

2. The network of claim 1, wherein the spare resource points and the optimal data transfer points include at least one of: a location element or a time element.

3. The network of claim 1, wherein the radio access network further includes a controller operable to control the use of network resources by the terminals, and to measure actual spare resource at the current point within the subsequent movement cycle and to provide this measurement to the processing device to enable the processing device to determine whether to approve data transfer.

4. The network of claim 1 wherein the list is processed by a client on the terminal and the client is operable to compare the current point in the subsequent movement cycle of the terminal to the points on the list to identify whether optimal data transfer is likely to be available at the current point.

5. The network of claim 4, wherein the client is operable to identify whether a request for data transfer is a low priority request and, for such a low priority request, only allowing the data transfer of the current point in the subsequent movement cycle is predicted to be an optimal data transfer point.

6. The network of claim 4, wherein the list is processed by the client in response to a request for data transfer by an application hosted by the terminal.

7. The network of claim 4 wherein the processing device is operable to record communication activity of the terminal within the movement cycle, to predict at what point communication activity will occur in the subsequent movement cycle and to instruct the client to request data transfer to perform the communication activity at a predicted optimal point within the subsequent movement cycle.

8. The network of claim 1, further comprising:
a data transfer device that adjusts content of the data for transfer.

9. The network of claim 8, wherein the data transfer device adjusts the content of the data in dependence upon actual spare resource.

10. A method of operating a mobile telecommunications network including a plurality of terminals, a core and a radio access network having a radio device for providing wireless communication resources to the terminals, the method comprising:
recording information indicative of a movement cycle of one of the terminals through the radio access network; and
identifying points within the movement cycle at which there are spare communication resources to provide a list of spare resource points to the terminal to enable the prediction of optimal data transfer points during a subsequent movement cycle of the terminal through the radio access network.

11. The method of claim 10, wherein the spare resource points and the optimal data transfer points include a location element and/or a time element.

12. The method of claim 10, wherein the radio access network includes a controller operable to control the use of network resources by the terminals, and the method includes measuring actual spare resource at the current point within the subsequent movement cycle and providing this measurement to the processing device to enable the processing device to determine whether to approve data transfer.

13. The method of claim 10, wherein the list is processed by a client on the terminal and the client compares the current point in the subsequent movement cycle of the terminal to the points on the list to identify whether optimal data transfer is likely to be available at the current point.

14. The method of claim 13, wherein the client identifies whether a request for data transfer is a low priority request and, for such a low priority request, only allows the data transfer of the current point in the subsequent movement cycle is predicted to be an optimal data transfer point.

15. The method of claim 13, wherein the list is processed by the client in response to a request for data transfer by an application hosted by the terminal.

16. The method of claim 13, further comprising:
recording communication activity of the terminal within the movement cycle, to predict at what point communication activity will occur in the subsequent movement cycle; and
instructing the client to request data transfer to perform the communication activity at a predicted optimal point within the subsequent movement cycle.

17. The method of claim 10, further comprising:
adjusting content of the data for transfer.

18. The method of claim 17, wherein content of the data for transfer is adjusted in dependence upon actual spare resource.

19. A non-transitory computer readable medium storing software for operating a mobile telecommunications network including a plurality of terminals, a core and a radio access network having a radio device for providing wireless communication resources to the terminals, the software comprising:

executable code that records information indicative of a movement cycle of one of the terminals through the radio access network; and
executable code that identifies points within the movement cycle at which there are spare communication resources to provide a list of spare resource points to the terminal to enable the prediction of optimal data transfer points during a subsequent movement cycle of the terminal through the radio access network.

20. The non-transitory computer readable medium of claim 19, wherein the list is processed by a client on the terminal and the client compares the current point in the subsequent movement cycle of the terminal to the points on the list to identify whether optimal data transfer is likely to be available at the current point, and wherein the software further comprises:
executable code that records communication activity of the terminal within the movement cycle, to predict at what point communication activity will occur in the subsequent movement cycle; and
executable code that instructs the client to request data transfer to perform the communication activity at a predicted optimal point within the subsequent movement cycle.

* * * * *